US010380727B2

(12) United States Patent
Foland et al.

(10) Patent No.: US 10,380,727 B2
(45) Date of Patent: Aug. 13, 2019

(54) SYSTEMS AND METHODS FOR GENERATING PROJECTION IMAGES

(71) Applicant: L-3 Communications Security & Detection Systems, Inc., Woburn, MA (US)

(72) Inventors: Andrew D. Foland, Wellesley, MA (US); Andrew David Smith, Tampa, FL (US); Justin L. Wright, Trinity, FL (US); Brian Joel Baker, St. Petersburg, FL (US)

(73) Assignee: L-3 Communications Security & Detection Systems, Inc., Woburn, MA (US)

( * ) Notice: Subject to any disclaimer, the term of this patent is extended or adjusted under 35 U.S.C. 154(b) by 146 days.

(21) Appl. No.: 15/240,688

(22) Filed: Aug. 18, 2016

(65) Prior Publication Data

US 2017/0323436 A1 Nov. 9, 2017

Related U.S. Application Data

(60) Provisional application No. 62/332,859, filed on May 6, 2016.

(51) Int. Cl.
*G06K 9/00* (2006.01)
*G06T 7/00* (2017.01)
(Continued)

(52) U.S. Cl.
CPC .......... *G06T 7/0002* (2013.01); *G06T 7/0004* (2013.01); *G06T 7/11* (2017.01);
(Continued)

(58) Field of Classification Search
CPC ..... G06T 7/0002; G06T 7/0081; G06T 15/08; G06T 15/205; G06T 19/20;
(Continued)

(56) References Cited

U.S. PATENT DOCUMENTS 7,356,174 B2 * 4/2008 Leue ................. G01V 5/005
                                                    382/131
8,457,273 B2   6/2013 Foland
(Continued)

FOREIGN PATENT DOCUMENTS

WO        2016130116 A1     8/2016

OTHER PUBLICATIONS

International Search Report and Written Opinion by the International Searching Authority for International Patent Application No. PCT/US2016/047562 dated Feb. 7, 2017.

*Primary Examiner* — Shefali D Goradia
(74) *Attorney, Agent, or Firm* — McCarter & English, LLP; David R. Burns

(57) ABSTRACT

Systems, methods, and non-transitory computer-readable media taught herein process a subset of a three-dimensional array of voxels to form an image of a region of interest in an object. Images thus formed are clear, comprehensible, and contextual. The systems, methods, and non-transitory computer-readable media taught herein select the subset of voxels that represent the region of interest along a direction perpendicular to a view direction defined by the region of interest. The subset of voxels represents one or more portions of a plurality of image slices of the object.

66 Claims, 16 Drawing Sheets

(51) Int. Cl.
  *G06T 15/08* (2011.01)
  *G06T 15/20* (2011.01)
  *G06T 19/20* (2011.01)
  *G06T 11/00* (2006.01)
  *G06T 7/11* (2017.01)
  *G06F 3/0484* (2013.01)
  *G06F 3/0488* (2013.01)

(52) U.S. Cl.
  CPC ............ *G06T 11/008* (2013.01); *G06T 15/08* (2013.01); *G06T 15/205* (2013.01); *G06T 19/20* (2013.01); *G06F 3/04842* (2013.01); *G06F 3/04845* (2013.01); *G06F 3/04883* (2013.01); *G06F 2203/04808* (2013.01); *G06T 2200/24* (2013.01); *G06T 2207/10028* (2013.01); *G06T 2207/10081* (2013.01); *G06T 2207/20021* (2013.01); *G06T 2207/20104* (2013.01); *G06T 2207/20216* (2013.01); *G06T 2207/30112* (2013.01); *G06T 2210/12* (2013.01); *G06T 2219/2016* (2013.01)

(58) Field of Classification Search
  CPC ....... G06T 2200/24; G06T 2207/10028; G06T 2207/10081; G06T 2207/20021; G06T 2210/12; G06T 2219/2016; G06F 3/04842; G06F 3/04845; G06F 3/04883; G06F 2203/04808
  See application file for complete search history.

(56) References Cited

U.S. PATENT DOCUMENTS

| | | |
|---|---|---|
| 9,285,498 B2 * | 3/2016 | Carver .................. G01N 23/04 |
| 9,632,206 B2 * | 4/2017 | Parikh ................... G06T 7/0004 |
| 2003/0016782 A1 | 1/2003 | Kaufman et al. |
| 2007/0297560 A1 | 12/2007 | Song et al. |
| 2010/0128950 A1 | 5/2010 | Woods et al. |
| 2013/0251228 A1 | 9/2013 | Polster |

* cited by examiner

SYSTEMS AND METHODS FOR GENERATING PROJECTION IMAGES

RELATED APPLICATION

The present application claims priority to U.S. Provisional Patent Application No. 62/332,859 filed on May 6, 2016, the entire contents of which is incorporated herein by reference.

BACKGROUND

Imaging technologies including x-ray computed tomography, magnetic resonance imaging (MRI), positron emission tomography (PET), and many others have found widespread use in applications as diverse as medical imaging and cargo inspection. Imaging techniques involve measuring a property of an object across an array of voxels in three-dimensions. For example, x-ray imaging techniques involve aiming a beam of x-ray radiation at the object to be imaged and measuring the intensity of x-rays received through the object. The attenuation of the x-ray beam depends on material properties of the object such as mass density or effective atomic number. Using imaging techniques, it is possible to reconstruct a three-dimensional or projected two-dimensional image of the object.

In security applications, the three-dimensional volumetric or two-dimensional projection images can be used to detect suspicious or dangerous objects hidden in baggage or cargo, for example, contraband. In medical applications, the three-dimensional volumetric or two-dimensional projection images can be used to detect organic or inorganic structures related to disease or injury within a biological organism.

SUMMARY

Taught herein are systems, methods, and non-transitory computer-readable media to form images of one or more regions of interest in an object by processing a subset of a three-dimensional array of voxels. The regions of interest in the object can include contraband or organic or inorganic structures related to disease or injury. The images formed using systems, methods, and non-transitory computer-readable media taught herein are clear, comprehensible, and contextual.

In some embodiments taught herein, a method of forming an image of an object is disclosed. Performance of the method receives, using at least one processing unit, a three-dimensional array of voxels representing an object. Performance of the method selects, using the at least one processing unit, a subset of voxels from the array representing a region of interest (ROI) of the object. The subset of voxels represents one or more portions of a plurality of image slices of the object and is selected along a direction perpendicular to a view direction defined by the ROI. Performance of the method forms an image of the ROI by processing the subset of voxels.

In some embodiments taught herein, an imaging system is disclosed including an imaging apparatus and a programmable processing unit. The imaging apparatus acquires measurement data of an object. The programmable processing unit has a central processing unit that is communicatively coupled to a memory. Upon execution of processor-executable instructions, the programmable processing unit operates to receive a three-dimensional array of voxels representing the object. The processing unit is also programmable to select a subset of voxels from the array representing a region of interest (ROI) of the object. The subset of voxels represents a subset of one or more portions of a plurality of image slices of the object and is selected along a direction perpendicular to a view direction defined by the ROI. The processing unit is also programmable to form an image of the ROI by processing the subset of voxels.

In some embodiments taught herein, a computer-implemented method is disclosed. Performance of the computer-implemented method renders, on a display, a graphical user interface (GUI) to display an image of an object. Performance of the computer-implemented method receives, via one or more graphical user interface elements of the GUI, an identification of a region of interest in the object. Performance of the computer-implemented method processes a subset of voxels from the three-dimensional array of voxels representing the object to form an image of the ROI in response to the identification of the region of interest. The subset of voxels represents one or more portions of a plurality of image slices of the object and is selected along a direction perpendicular to a view direction defined by the region of interest. Performance of the computer-implemented method renders the image of the ROI in a window of the GUI. Performance of the computer-implemented method receives input via the GUI to manipulate the image of the ROI.

BRIEF DESCRIPTION OF THE DRAWINGS

The skilled artisan will understand that the drawings are primarily for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar or structurally similar elements).

The foregoing and other features and advantages provided by the present disclosure will be more fully understood from the following description of exemplary embodiments when read together with the accompanying drawings, in which.

DETAILED DESCRIPTION

Figure 1:
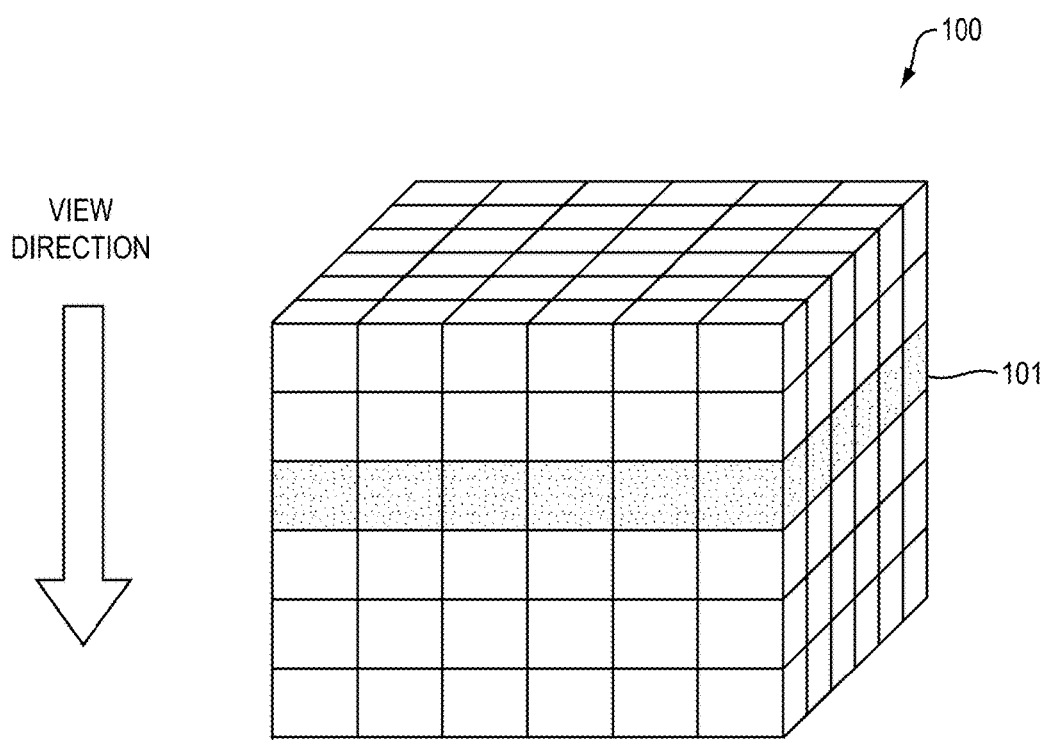
FIG. 1 illustrates a prior art selection of a slice of a three-dimensional array of voxels for use in generating a projection image.

Systems, methods, and non-transitory computer-readable media taught herein process a subset of a three-dimensional array of voxels to form an image of a region of interest (ROI) in an object. Images formed using the systems, methods, and non-transitory computer-readable media taught herein are clear, comprehensible, and contextual. Images formed in accordance with the teachings herein allow a viewer, for example, a medical professional, a security agent, or other, to select a region of interest of an object under examination and have a subset of voxels representing the ROI processed to form an image of the ROI. The systems, methods, and computer-readable media can render a two-dimensional image of the selected ROI that is interpretable by the viewer or by an image processing algorithm of a computer. The systems, methods, and non-transitory computer-readable media taught herein select the subset of voxels that represent the region of interest along a direction perpendicular to a view direction defined by the region of interest. The subset of voxels represents one or more portions of a plurality of image slices of the object.

The systems, methods, and computer-readable media taught herein are applicable to any three-dimensional array of voxels regardless of the type of x-ray system used to collect the voxel data. As taught herein, any three-dimensional array of voxels can be processed as taught herein to produce and render images of improved quality and resolution to facilitate identification of and examination of objects included therein.

As described herein, an "object" encompasses a volume that includes a physical mass and space surrounding the physical mass. The term "object" is not limited to the bounds of a particular physical object but is to be considered as a volume that may include one or more physical objects, empty space, or both. In embodiments disclosed herein related to x-ray computed tomography systems, the "object" can include, but is not limited to, an item such as a bag, bin or other container under inspection, items disposed within the bag, bin or other container, portions of the internal volume of a tunnel or scanning region through which the item passes, a human body or any portion thereof, or an animal body and any portion thereof.

As described herein, a "region of interest" can be any subset of voxels that is to be imaged from a three-dimensional array of voxels representative of the object. In particular, the term "region of interest" can include one or more items or one or more objects, empty space, or both, and is not limited to a location within an object that includes an item such as contraband or a portion of a skeletal system. In various embodiments, the region of interest can be identified by a user using an interactive user element of a computing system or can be identified based on implementation of a computer-implemented method.

As described herein, a "slice" or an "image slice" of the three-dimensional array of voxels can be a plurality of voxels having the same coordinate value along a coordinate axis (e.g., the same x-value, y-value, or z-value) of the three-dimensional array of voxels. In some embodiments, the "slice" or an "image slice" can correspond to voxels of the three-dimensional array of voxels that lie in a plane along a coordinate axis of the three-dimensional array of voxels.

As part of a wide range of image reconstruction techniques, a three-dimensional volumetric representation of an object is generated including a plurality of voxels. The plurality of voxels includes data representative of a physical property of the object such as density, effective atomic number, or electron spin relaxation times. The plurality of voxels can be visualized volumetrically or by projecting the data into two-dimensions. Methods of generating the two-dimensional projection image include collapsing the entire three-dimensional array of voxels along an axis representing a view direction or selecting a single slice of the three-dimensional array of voxels that includes some or all of the voxels that have the same value along the axis representing the view direction (i.e., an x-axis, y-axis, z-axis, or any other direction with respect to a coordinate system of the volume). An image produced by collapsing the entire three-dimensional array of voxels includes features that a human or machine viewer can intuitively recognize and understand. However, collapsing the entire three-dimensional array of voxels produces a cluttered image wherein features at different depths along the view direction overlap and become largely indistinguishable in the projection image.

Conversely, a single slice provides a cleaner image wherein the pixels correspond directly to individual physical measurements of a property of the object. However, single slice images are highly unintuitive to human and machine viewers because no additional context is provided to help the viewer identify what is shown in the image. Hence, users of imaging systems that provide single slice images require extensive training to understand how to interpret the visual information provided in a single-slice image. In addition, viewing a full object using single slices is very time-consuming due to the large number of image slices in an object. In contexts such as the security context where high throughput is essential, an unacceptable amount of time may be needed to step through single slices of the object.

Disclosed herein are methods, systems, and non-transitory computer readable media to provide intuitive and visually parsable two-dimensional projection images from a three-dimensional array of voxels representing an object. The systems, methods, and non-transitory computer-readable media of providing two-dimensional projection images described herein improve upon previous methods of generating two-dimensional images by providing cleanly separated views of features within the object while retaining high comprehensibility to a human or machine viewer.

The systems, methods, and non-transitory computer-readable media of the present disclosure select a subset of voxels from the three-dimensional array of voxels that represent a region of interest (ROI) of the object. The subset of voxels represents one or more portions of a plurality of image slices of the object and is selected along a direction perpendicular to a view direction defined by the ROI. An image of the ROI can be formed by processing the subset of voxels. Images rendered using the systems, methods, and non-transitory computer-readable media described herein retain the context and intuitiveness of projection images that collapse the full volumetric dataset while providing a simple and uncluttered appearance.

In some embodiments, selection of the subset of voxels can be performed more than once to represent additional regions of interest. For example, the subset of voxels representing the ROI can be a first subset of voxels representing a first ROI. In these embodiments, the systems, methods, and non-transitory computer-readable media described herein can further select a second subset of voxels from the three-dimensional array of voxels representing a second ROI. The systems, methods, and non-transitory computer-readable media of these embodiments can further render, using the graphic unit, the image of the first ROI and the image of the second ROI on a display according to a user control. In various embodiments, the image of the second ROI is different than the image of the first ROI.

Figure 11:
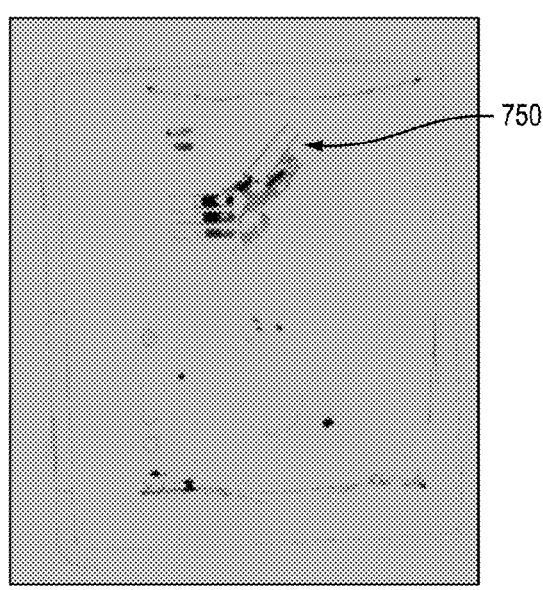
FIG. 11 illustrates a conventional prior art single-slice projection image of the object of FIG. 10 including the contraband.

FIG. 1 illustrates a prior art scheme for selecting voxels to generate a projection image by selecting a single slice 101 from a three-dimensional array of voxels 100. The projection image generated by using this conventional method consists of the object data in the single slice. Because features in the object are not always aligned with the view direction, the thin sections of features in the object that are visible in the projection image may be unrecognizable or miscategorized by a human or machine viewer due to the lack of context. As a result, the user may miss contraband in the object. An example of an image of a single slice is depicted in FIG. 11.

Figure 2:
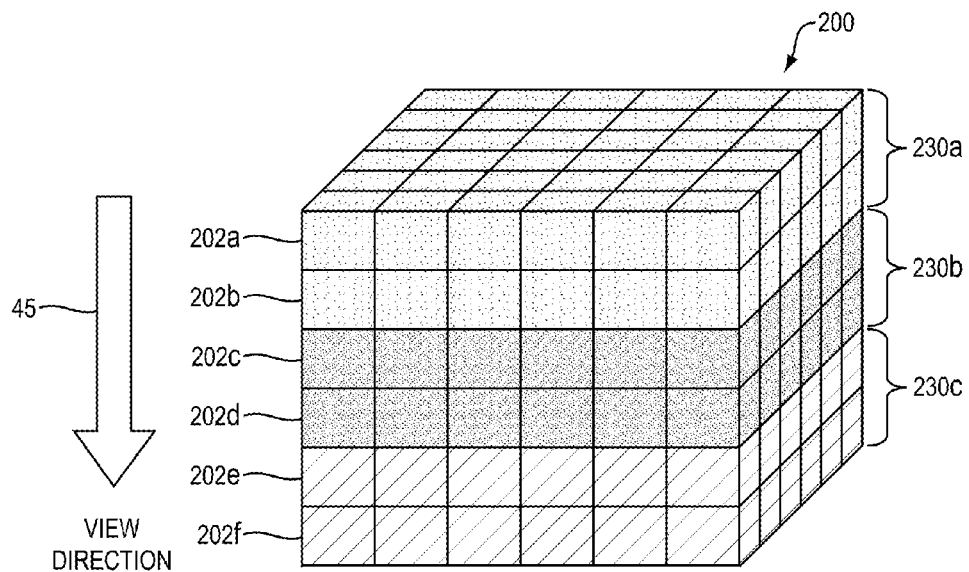
FIG. 2 illustrates example grouping of slices of a three-dimensional array of voxels to form subsets of voxels for use in rendering one or more projection images of portions of one or more regions of interest of an object in accordance with some embodiments of the present disclosure.
Figure 3:
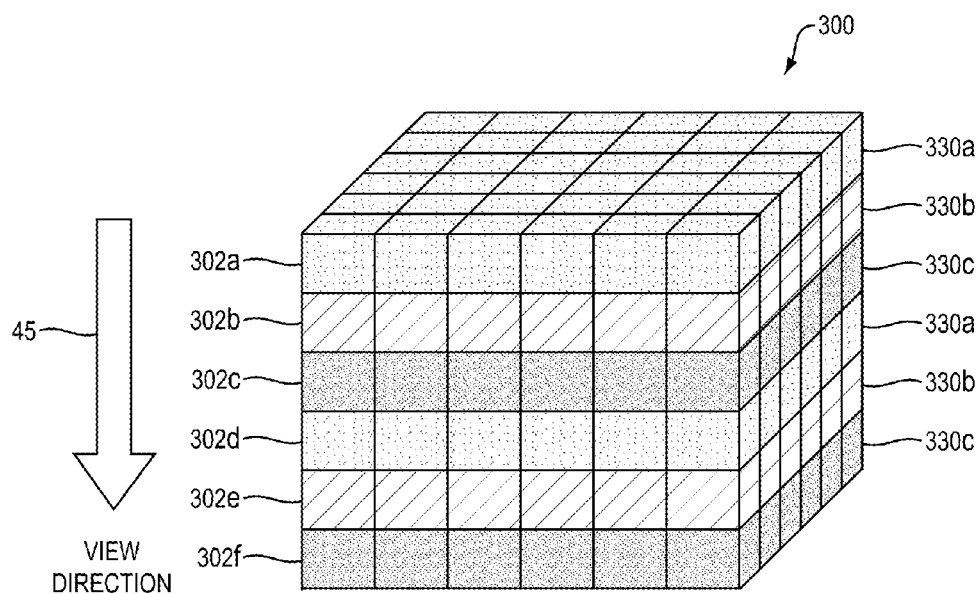
FIG. 3 illustrates example grouping of slices of the three-dimensional array of voxels to form subsets of voxels for use in rendering one or more projection images of portions of one or more regions of interest of the object in accordance with some embodiments of the present disclosure.
Figure 4:
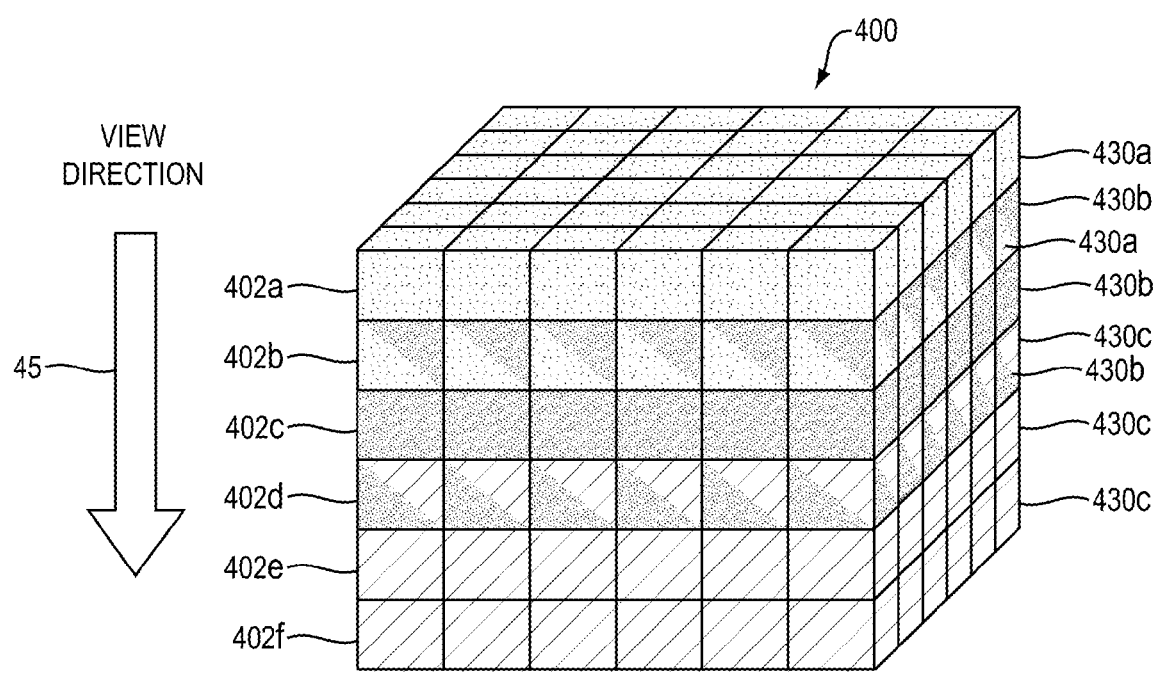
FIG. 4 illustrates example grouping of slices of the three-dimensional array of voxels to form subsets of voxels for use in rendering one or more projection images of portions of one or more regions of interest of the object in accordance with some embodiments of the present disclosure.

FIGS. 2-4 illustrate subsets of voxels of a three-dimensional array of voxels for use in rendering one or more projection images of portions of one or more regions of interest of an object in accordance with embodiments of the present disclosure. Each three-dimensional array of voxels 200, 300, 400 illustrated in FIGS. 2-4, respectively, can, in some embodiments, be a reconstructed volumetric dataset generated from measurement data obtained using a tomographic imaging technique. In some embodiments, the measurement data can be indicative of an interaction of an x-ray with the object. In some embodiments, a dimension of each voxel in the array of voxels can be in a range of 0.1 mm to 10 mm. In some embodiments, the dimension of each voxel in the array of voxels can be 1 mm. The three-dimensional array of voxels can be generated from the measurement data using one or more direct reconstruction techniques, one or more iterative reconstruction techniques, or a combination of direct and iterative reconstruction techniques. In some embodiments, the three-dimensional array of voxels can be reconstructed using a methodology that is classically complete (i.e., generated from measurement data that is pi-line complete or that is collected over a scan path that includes 180° around the object). In some embodiments, the three-dimensional array of voxels can be reconstructed using a methodology that is classically incomplete (i.e., generated from measurement data that was obtained over a scan path that is less than 180° around the object). In some embodiments, the three-dimensional array of voxels can include object data obtained from a magnetic resonance imaging (MRI) technique, a positron emission tomography (PET) technique, or any other suitable tomographic technique that can generate a data in the form of a three-dimensional array of voxels.

In FIG. 2, the three-dimensional array of voxels 200 has been divided into a plurality of image slices 202a-202f. In accordance with some embodiments, the three-dimensional array of voxels 200 can include one or more regions of interest (ROIs) represented by a subset of voxels from the array 200 selected along a direction perpendicular to a view direction defined by the ROI. For example, the array of voxels 200 can include a first subset of voxels 230a representing a first ROI, a second subset of voxels 230b representing a second ROI, and a third subset of voxels 230c representing a third ROI. Although three subsets of voxels 230a-230c are shown in FIG. 2, any suitable number of subsets can be selected from the three-dimensional array of voxels 200. By processing the subset of voxels 230a-230c representing one or more ROIs, an image of one or more of the ROIs can be formed. In various embodiments, the image or images of one or more of the ROIs can be rendered using a graphic unit. In some embodiments, the image or images of the one or more of the ROIs can be processed using a computing device to detect a contraband item within the object or an object or item within a human or animal.

In some embodiments, the subset of voxels 230a-230c representing each of the ROIs can represent one or more portions of a plurality of image slices 202a-202f. For example, the subset of voxels 230a representing the first ROI can represent one or more portions of a first slice 202a and a second image slice 202b. The subset of voxels 230b representing the second ROI can represent one or more portions of a third image slice 202c and a fourth image slice 202d The subset of voxels 230c representing the third ROI can represent one or more portions of a fifth image slice 202e and a sixth image slice 202f. As shown in FIG. 2, the first subset of voxels 230a and the second subset of voxels 230b can be contiguous. In some embodiments, the subset of voxels can include less than all of the voxels included in one or more of the plurality of slices 202a-202f.

In accordance with various embodiments, the subset of voxels representing each of the ROIs can be selected along a direction perpendicular to the view direction 45 defined by the ROI. Although the view direction 45 is shown as parallel to a basis axis of the three-dimensional array of voxels 200 in FIGS. 2-4, the view direction 45 can be angled at any direction with respect to the orientation of the array of voxels 200. In some embodiments, the coordinate axes of the three-dimensional array of voxels 200 can be rotated to align with the view direction 45.

In accordance with various embodiments, the plurality of image slices 202a-202f can correspond to planes at different depths along a coordinate axis of the array of voxels 200. In some embodiments, each of the plurality of image slices 202a-202f can include all of the voxels at each coordinate value along the coordinate axis of the array of voxels 200. Although the array of voxels 200 has been divided into six image slices 202a-202f in FIG. 2, it will be understood by one skilled in the art that the plurality of voxels can be divided into any number of image slices. For example, a three-dimensional array of voxels reconstructed from object data in a security setting can be divided into thousands of image slices.

The subset of voxels 230a-230c that represent each of the ROIs can be processed in accordance with various methods to form an image of each respective ROI. For example, the subset of voxels 230a from the first image slice 202a and the second image slice 202b can represent the first ROI and can be processed to form an image of the first ROI. In some embodiments, data of the object included in the subset of voxels can be summed along the view direction 45. In other embodiments, data of the object included in the subset of voxels can be averaged along the view direction 45.

In FIG. 3, the three-dimensional array of voxels 300 has been divided into a plurality of image slices 302a-302f. In accordance with some embodiments, the three-dimensional array of voxels 300 can include one or more regions of interest (ROIs) represented by a subset of voxels from the array of voxels 300 selected along a direction perpendicular to a view direction 45 defined by the ROI. In accordance with some embodiments of the present disclosure, one or more of the ROIs can include one or more portions of a plurality of non-contiguous slices. In other words, each of the subsets of voxels 330a-330c representing the ROIs can include gaps in voxels parallel to the view direction wherein voxels included in the gaps are not included in the corresponding subset of voxels. For example, the first subset of voxels 330a representing the first ROI can include a first slice 302a and a fourth slice 302d. The second subset of voxels 330b representing the second ROI can include a second slice 302b and a fifth slice 302e. The third subset of voxels 330c representing the third ROI can include a third slice 302c and a sixth slice 302f. In some embodiments, one or more of the subsets of voxels 330a-330c can be interlaced (i.e., a portion of the second subset of voxels 330b can be interjected between portions of the first subset of voxels 330a). In some embodiments, the subset of voxels can include less than all of the voxels included in one or more of the plurality of slices 302a-302f.

In accordance with various embodiments, the subset of voxels 330a-330c representing each of the ROIs can be selected along a direction perpendicular to the view direction 45 defined by the ROI. Although the view direction 45 is shown as parallel to a basis axis of the three-dimensional array of voxels 300, the view direction 45 can be angled at any direction with respect to the orientation of the array of voxels 300. In some embodiments, the coordinate axes of the three-dimensional array of voxels 300 can be rotated to align with the view direction 45.

In FIG. 4, the three-dimensional array of voxels 400 has been divided into a plurality of image slices 402a-402f. In accordance with some embodiments, the three-dimensional array of voxels 400 can include one or more regions of interest (ROIs) represented by a subset of voxels from the array of voxels 400 selected along a direction perpendicular to a view direction 45 defined by the ROI. The first subset of voxels 430a representing the first ROI can include a first image slice 402a and a second image slice 402b. The second subset of voxels 430b representing the second ROI can include the second image slice 402b, a third image slice 402c, and a fourth image slice 402d. The third subset of voxels 430c representing the third ROI can include the fourth image slice 402d, a fifth image slice 402e, and a sixth image slice 402f. In accordance with some embodiments of the present disclosure, at least one voxel of the first subset of voxels 430a representing the first ROI can also be included in the second subset of voxels 430b representing the second ROI. For example, voxels in second image slice 402b can be included in the first subset of voxels 430a and in the second subset of voxels 430b in some embodiments. Likewise, voxels in the fourth image slice 402d can be included in the second subset of voxels 430b and the third subset of voxels 430c. In accordance with various embodiments, the first subset of voxels 430a and the second subset of voxels 430b can include different numbers of voxels. For example, the first subset of voxels 430a in FIG. 4 can include all of the voxels in the first image slice 402a and the second image slice 402b while the second subset of voxels 430b can include all of the voxels in the second image slice 402b, the third image slice 402c, and the fourth image slice 402d. In other embodiments, the first subset of voxels 430a and the second subset of voxels 430b can include the same number of voxels.

Although the view direction 45 defined by the second ROI is parallel to the view direction 45 defined by the first ROI in FIGS. 2-4, the relationship between the two view directions is not constrained and the two view directions can be at any angle with respect to one another.

Figure 5:
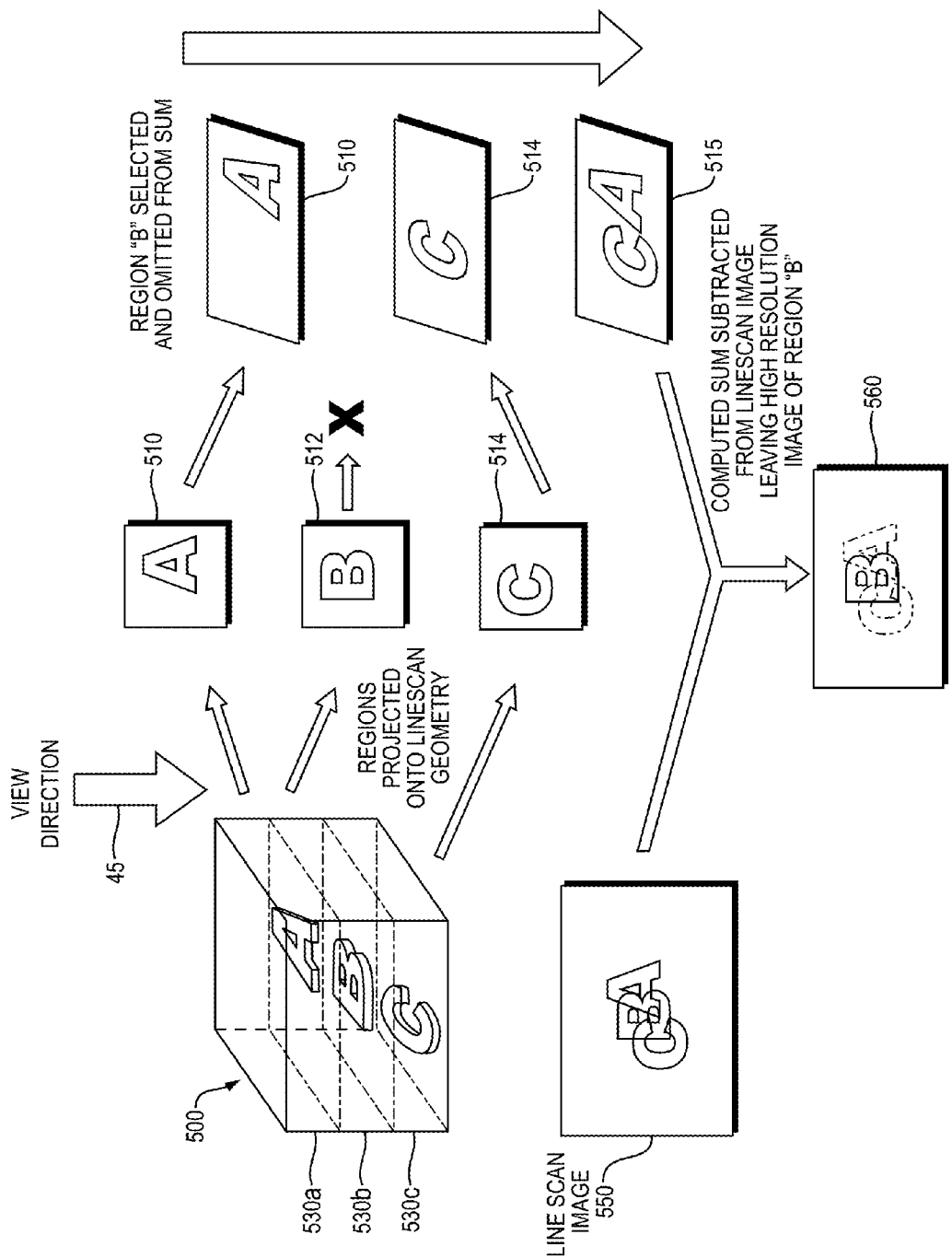
FIG. 5 illustrates an example method of rendering a projection image of a portion of an object in accordance with some embodiments of the present disclosure.

FIG. 5 illustrates a method of rendering a projection image of a portion of an object by omission of a subset of voxels from the three-dimensional array of voxels in accordance with some embodiments of the present disclosure. As depicted in FIG. 5, a three-dimensional array of voxels 500 can be divided into subsets of voxels 530a-530c representing the first ROI, the second ROI, and the third ROI. In some embodiments, each of the subsets of voxels 530a-530c can be projected or resampled onto a linescan geometry. For example, projection of each of the subsets of voxels 530a-530c onto a linescan geometry can include projecting from an orthographic to a perspective orientation. In the embodiment depicted in FIG. 5, the first subset of voxels 530a becomes projected first ROI 510, the second subset of voxels 530b becomes projected second ROI 512, and the third subset of voxels 530c becomes projected third ROI 514.

In some embodiments, the data of the object excluded from the subset of voxels representing an ROI can form a first two-dimensional dataset. For example, voxels excluded from projected second ROI 512 (i.e., the projected first ROI 510 and the projected third ROI 514 in this example) can be used to form a first two-dimensional dataset. In some embodiments, the first two-dimensional dataset is formed by summing the data along the view direction 45. For example, data in the projected first ROI 510 and the projected third ROI 515 can be summed to create the first two-dimensional dataset 515.

In some embodiments, a second two-dimensional dataset 550 can be formed by using the full three-dimensional array of voxels. For example, the second two-dimensional dataset 550 can be generated from measurement data obtained using a line-scan imaging technique or can be a full projection image along the view direction 45 including the entire array of voxels 500. In accordance with various embodiments, a projection image of the ROI can be generated by subtracting the first two-dimensional dataset from the second two-dimensional dataset. For example, the first two-dimensional dataset 515 can be subtracted from the second two-dimensional dataset 550 to create a projection image 560 of the second ROI 530*b*. In some embodiments, images created using a line-scan imaging technique can be of higher resolution than projection images formed from voxels of an array of voxels 500. Subtraction of the first two-dimensional dataset from the second two-dimensional dataset as described herein can provide the ability to isolate an ROI in a higher resolution image than would be possible by manipulating only the three-dimensional array of voxels 500.

In accordance with various embodiments of the present disclosure, reconstruction of the three-dimensional array of voxels representing an object can be a separate and distinct process from segmentation of the array of voxels to based on specific criteria. In some embodiments, a user can select and review one or more ROIs continuously while viewing volumetric images of the object as described in greater detail below. In some embodiments, segmentation of the array of voxels can occur automatically after reconstruction but before algorithmic discovery of appropriate ROIs.

The volume of the object can be less than the total volume represented in the three-dimensional array of voxels 200, 300, 400, 500. In some embodiments, segmentation of the three-dimensional array of voxels can occur to identify an object or item represented within the array of voxels. In some embodiments, an image slice can be determined that denotes an edge of the object. For example, the image slice can be identified that is at the edge of a sub-volume of the array of voxels 200 that encompasses between 90% and 100%, or more preferably between 95% and 100%, or most preferably between 99% and 100% of a total sum of the data of the object in the three-dimensional array of voxels 200, 300, 400, 500. In some embodiments, the data of the object can be mass density, and the image slice can be identified that is at the edge of a sub-volume of the array of voxels 200, 300, 400, 500 that includes 99% or more of the total mass found in the three-dimensional array of voxels. In embodiments where the image slice that is at the edge of the object is determined, voxels beyond that slice can be excluded from any selected subset of voxels. By excluding voxels that do not represent data of the object (i.e., that represent empty space), computational overhead can be reduced without reducing image quality. In addition, empty voxels can include errors that occur during reconstruction of the array of voxels 200, 300, 400, 500. By excluding the empty voxels, the error rate can be reduced and the image quality can be increased.

Figure 6:
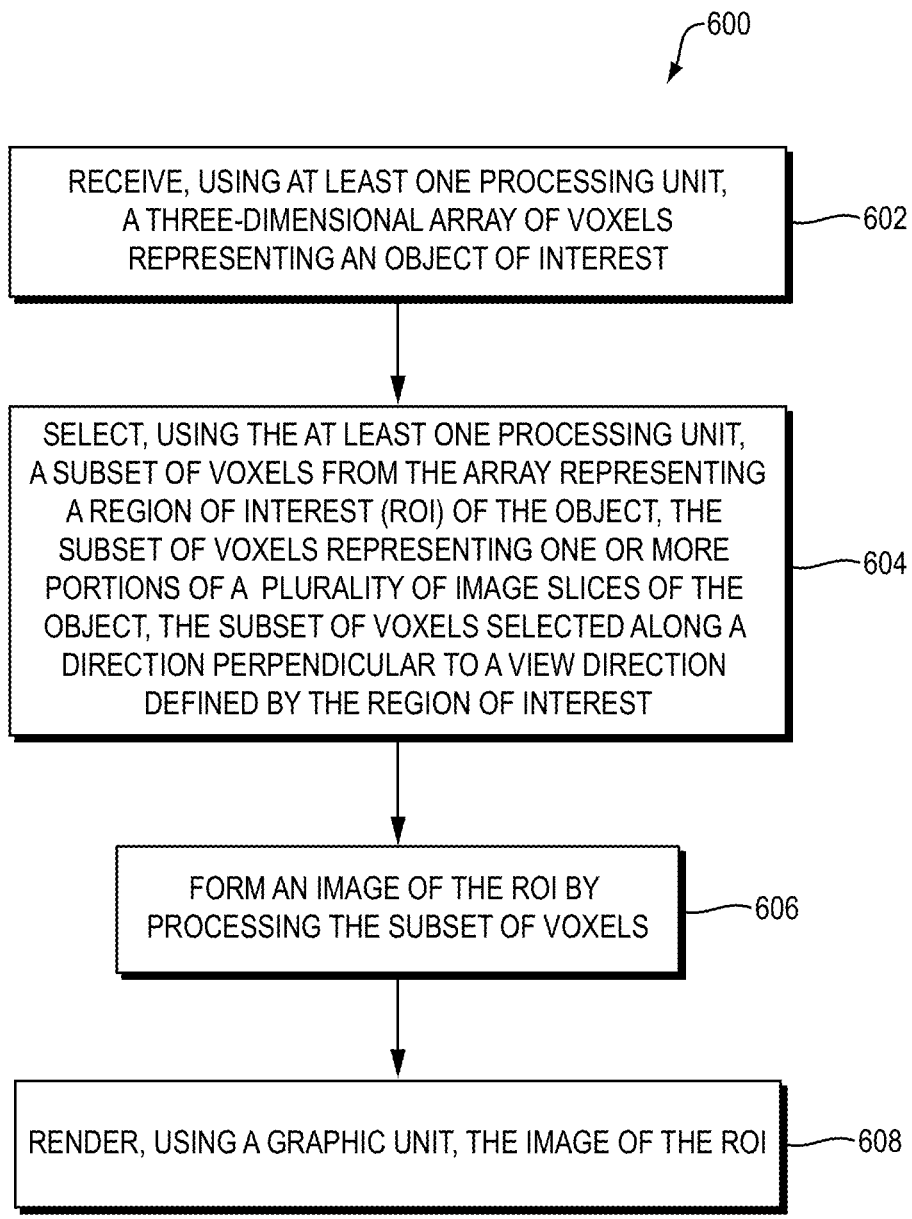
FIG. 6 illustrates a flowchart for forming an image of an object in accordance with some embodiments of the present disclosure.

A method of forming an image of an object is depicted in FIG. 6 in accordance with various embodiments. Performance of the method 600 receives, using at least one processing unit, a three-dimensional array of voxels (100, 200, 300, 400, 500) representing an object in Step 602. In step 604, a subset of voxels (230*a*-230*c*, 330*a*-330*c*, 430*a*-430*c*) is selected from the array representing a region of interest (ROI) of the object using the at least one processing unit. The subset of voxels represents one or more portions of a plurality of image slices (202*a*-202*f*, 302*a*-302*f*, 402*a*-402*f*) of the object. The subset of voxels is selected along a direction perpendicular to a view direction defined by the ROI. In some embodiments, the entire object can be automatically partitioned into ROIs of a predetermined size. In such embodiments, each subset of voxels representing an ROI can include one or more portions of between 2 and 30 image slices. In step 606, an image is formed of the ROI by processing the subset of voxels. In some embodiments, step 608 renders, using a graphic unit, the image of the ROI.

Figure 7:
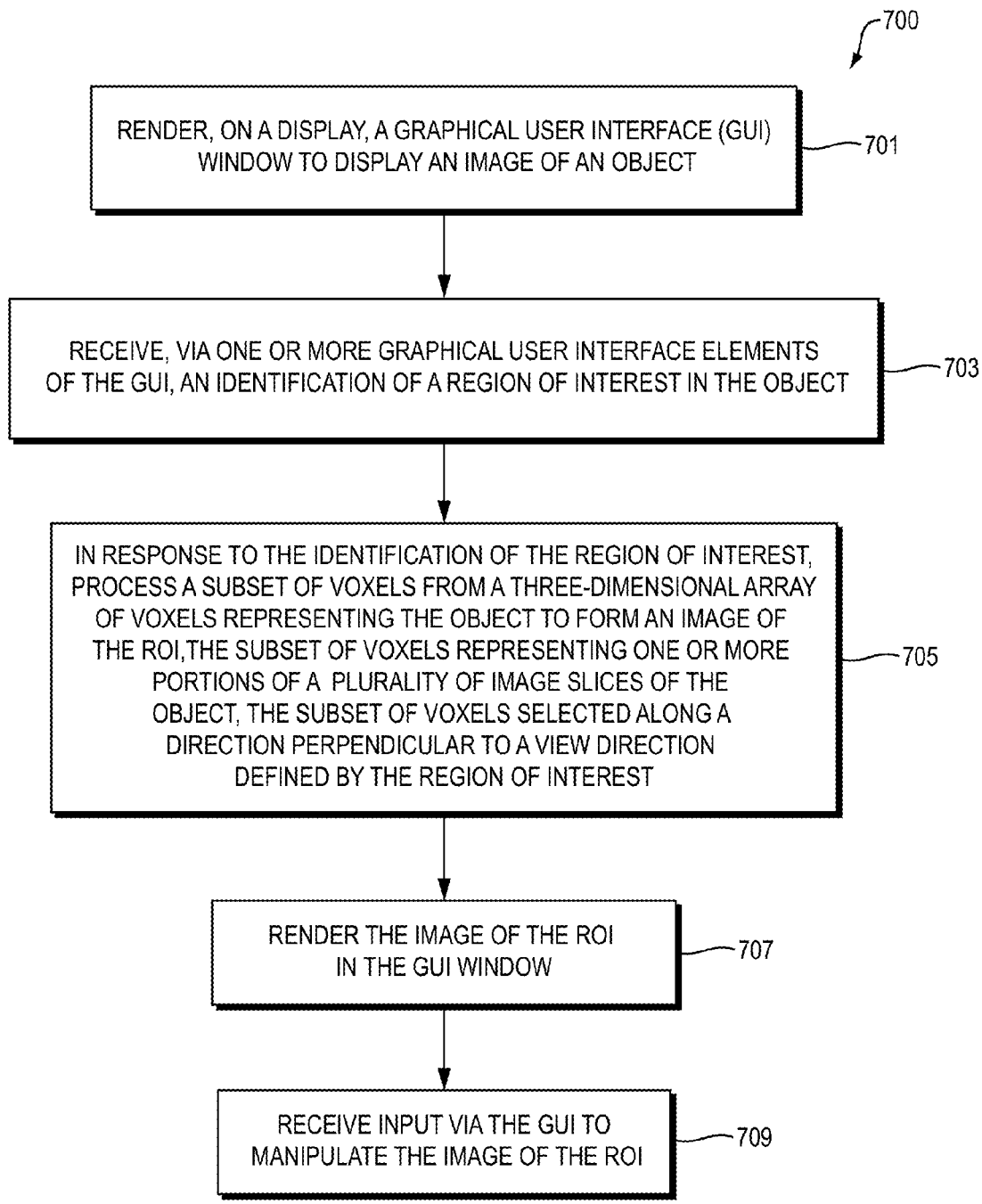
FIG. 7 illustrates a flowchart for forming an image of an object according to some embodiments of the present disclosure.
Figure 13:
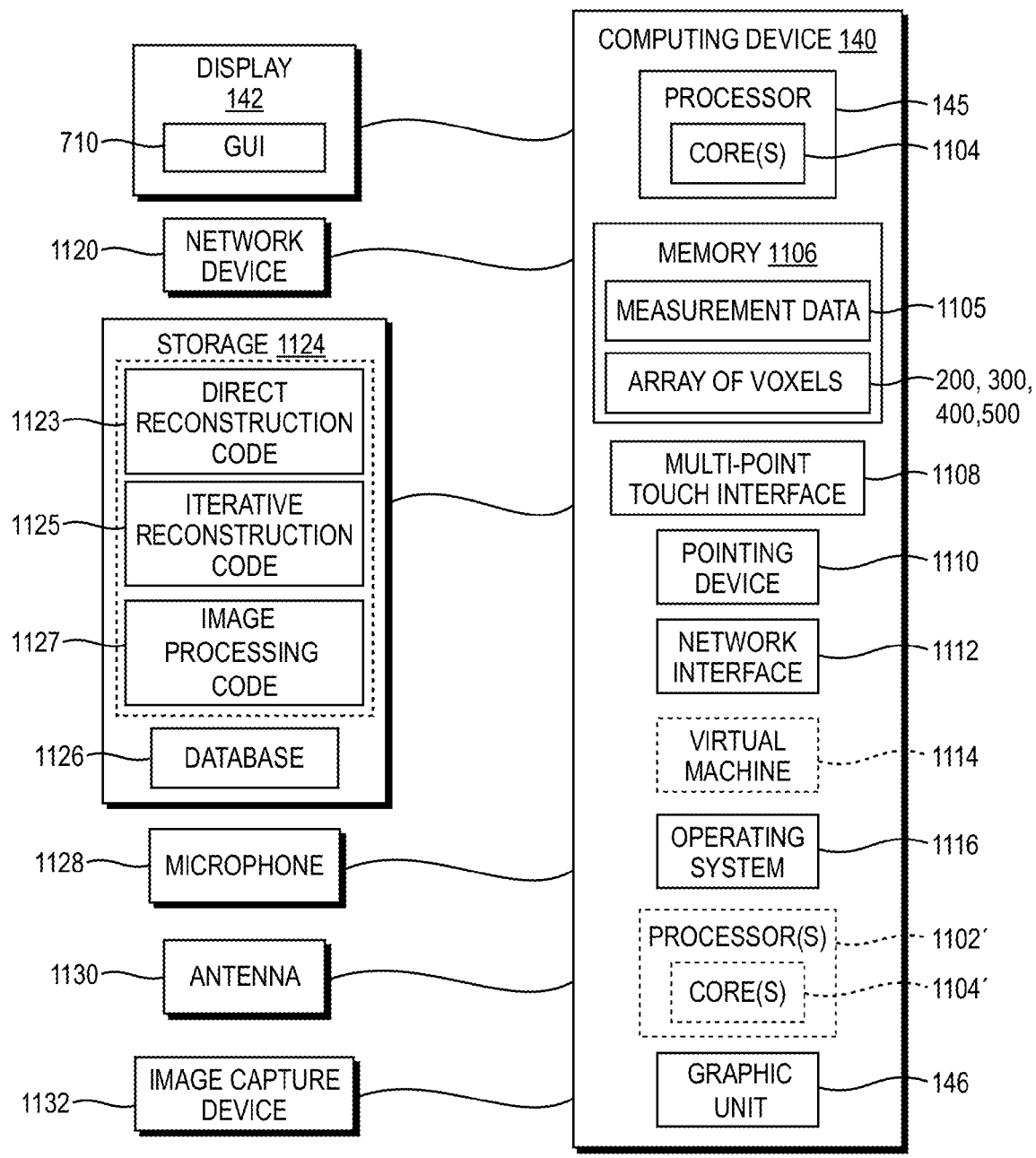
FIG. 13 illustrates an exemplary computing device, according to embodiments of the present disclosure.

A computer-implemented method is depicted in FIG. 7 in accordance with some embodiments. Performance of the computer-implemented method 700 renders a GUI 710 on a display to display an image of an object in step 701. In step 703, input is received, via one or more graphical user interface elements of the GUI, to identify a region of interest of the image of the object. In step 705, a subset of voxels from a three-dimensional array of voxels representing an ROI of the object is processed to form an image of the ROI in response to receipt of the identification of the ROI. The subset of voxels represents one or more portions of a plurality of image slices of the object. The subset of voxels is selected along a direction perpendicular to a view direction defined by the region of interest. In step 707, the image of the ROI is rendered in the GUI window. In step 709, input is received via the GUI to manipulate the image of the ROI. An example of a computational device for performing the computer implemented-method is illustrated in FIG. 13.

Figure 8:
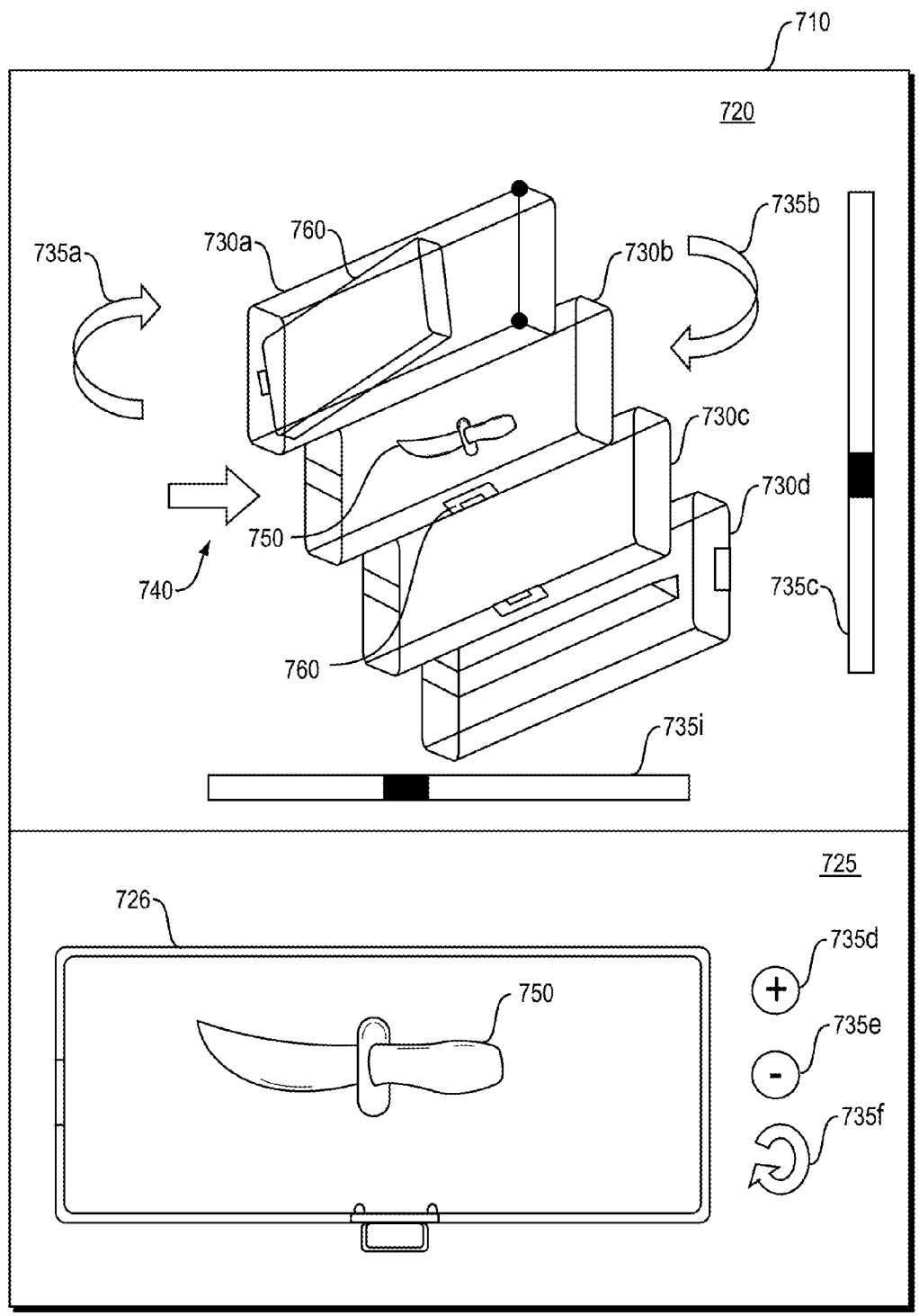
FIG. 8 illustrates a graphical user interface window displaying one or more projection images of one or more regions of interest of an object in accordance with some embodiments of the present disclosure.
Figure 9:
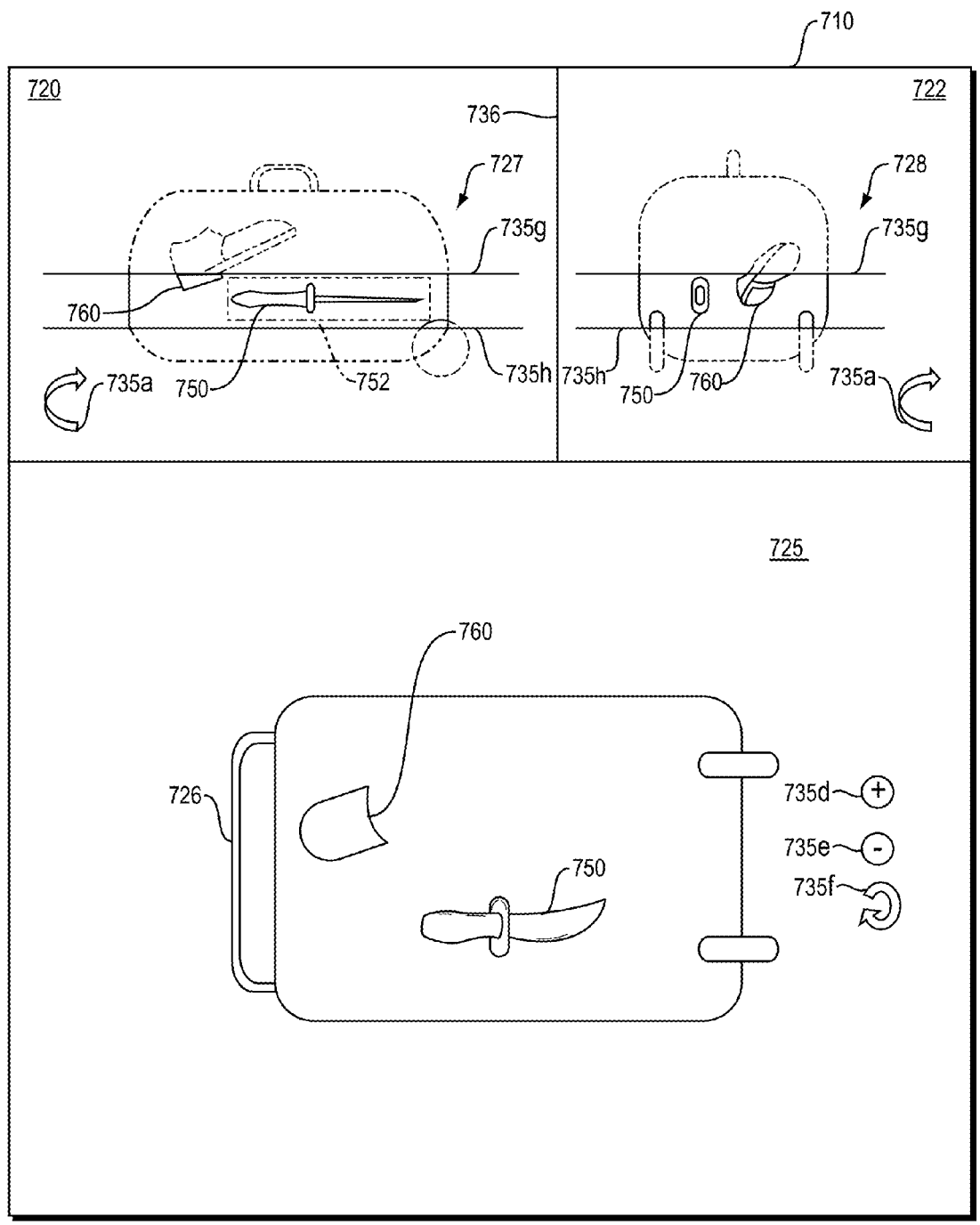
FIG. 9 illustrates a graphical user interface window displaying one or more projection images of portions of one or more regions of interest of an object in accordance with some embodiments of the present disclosure.

FIGS. 8 and 9 illustrate exemplary windows of a graphical user interface 710 according to various embodiments of the disclosure taught herein. The graphical user interface (GUI) 710 can include one or more windows 720, 722, 725. In FIG. 8, the GUI 710 includes a first window 720 and a second window 725. The first window 720 can be rendered to display multiple ROI images of the object as taught herein. The second window 725 can render a resizable view 726 of an ROI image selected from first window 720.

In some embodiments, the image of the object is a volumetric image. In some embodiments, the volumetric image can be divided into regions of interest as discussed above in relation to FIGS. 2-5. In some embodiments, the ROIs can be rendered individually one at a time or rendered individually as part of a montage of images representing a plurality of ROIs in the object of interest. The montage of images may be rendered to appear in a stacked relationship with the image of each ROI individually selectable by a user using a pointing device, by scrolling or manipulating a wheel on the pointing device, or by interaction with a touchscreen of the display device. By examining the separated ROIs, the user can preliminarily identify contraband 750 as it is not obscured by surrounding items 760 in the object. Identification or selection of the ROI by the user can cause the computer-implemented method to process a subset of voxels representing that ROI to form an image of the ROI. The projection image of the ROI can be displayed in the second window 725.

As depicted in the first window 720, four ROI images 730*a*-730*d* are shown with separation between them for improved visibility. In some embodiments, the multiple ROI images 730*a*-730*d* can rotate before the viewer upon selection of a GUI element, for example, view rotation arrows 735*a*, 735*b*. In some embodiments, the user can use rotation view arrows 735*a*, 735*b* to rotate one or more of the ROI images 730*a*-730*d* in the first window 720 individually or can rotate some or all of the ROI images 730*a*-730*d* as a group. In some embodiments, the user can use a slider bar 735*c* to bring different ROI images into view or to select an ROI image for further action. The slider bar 735c allows the user to scroll the ROI images 730a-730d up or down in a vertical direction. The slider bar 735i allows the user to scroll the ROI images 730a-730d from side-to-side in a horizontal direction. In some embodiments, the GUI 710 can provide a visual indicator 740 of the ROI corresponding to the resizable ROI image 726 that is rendered in the second window 725. The visual indicator 740 can be an arrow rendered on the display. To highlight an ROI to the user, differences in the display contrast including coloration, shading, or line thickness, lines delineating the edges of the ROI, or any other suitable method can be used. In some embodiments, the user can select the location of the ROI in the object.

In some embodiments, the user uses one or more GUI elements 735a-735i of the GUI 710 to identify, review, and manipulate one or more of the ROIs 730a-730d in the first window 720 or the second window 725. These GUI elements can include, but are not limited to, slider bars, view rotation arrows, magnification buttons, demagnification buttons, image size reset buttons, menus, buttons, gesture elements responsive to a gesture, or mouse control elements. In some embodiments, the mouse control element can include input from rotation of a mouse wheel. In some embodiments, the GUI elements can be configured to allow the user to select a dimension or location of the ROI. For example, the GUI element can allow the user to expand or contract the ROI. In some embodiments, the GUI 710 can provide a magnification button 735d and a demagnification button 735e to allow increase or decrease in the magnification of the resizable ROI image 726. Similarly, the GUI 710 can provide a rotation button 735f to allow the viewer to rotate the orientation of the resizable ROI image 726.

FIG. 9 depicts another example of multiple windows of the GUI 710. As depicted in FIG. 9, the GUI 710 includes the first window 720, the second window 725, and a third window 722. In accordance with various embodiments, the first window 720, second window 725, and third window 722 can each include a projection image of the object. In some embodiments, the rendered projection images 727, 728, 726 in each window 720, 722, 725 are formed along different view directions. In some embodiments, one or more of the projection images 727, 728 are full projection images formed by collapsing the entire three-dimensional array of voxels. In some embodiments, the one or more projection images can be formed along perpendicular view directions. The object depicted in FIG. 9 includes contraband 750 and surrounding items 760. The use of multiple projection images along different view directions can increase the likelihood that the user will preliminarily identify contraband 750.

In some embodiments, a side projection view 727 and an end projection view 728 of the object can be shown in the first window 720 and the third window 722, respectively. In some embodiments, the side projection view 727 and the end projection view 728 can be generated by collapsing the full three-dimensional array of voxels. The complementary views of the object seen in the side projection view 727 and the end projection view 728 can help the user preliminarily identify contraband 750 items among surrounding objects 760. In some embodiments, an ROI can be depicted in the side projection view 727 and the end projection view 728 between moveable GUI line elements 735g and 735h, respectively. A resizable ROI image 726 from between the movable GUI line elements 735g and 735h can be formed as taught herein and can be displayed in the second window 725.

If the user preliminarily identifies contraband 750, the user can adjust the ROI to focus on the contraband 750 and at least partially exclude surrounding objects 760 to produce a suitable projection image including the contraband 750. In various embodiments, the ROI can be visualized in the projection views 727, 728 using differences in display contrast such as coloration, shading, or line thickness or by using lines delineating the edges of the ROI. In some embodiments, a line 736 is provided to separate the first window 720 and the third window 722. In some embodiments, the line 736 can be moved by the user to adjust the relative size of the first window 720 and the third window 722. In some embodiments, the GUI 710 dynamically resizes the side projection image 727 and the end projection image 728 as the user slides the dividing line 736 from side-to-side.

In some embodiments, the user can use the moveable elements 735g, 735h to select a dimension of the ROI. For example, the user can use a pointing device in the one or more projection images to drag the moveable GUI line elements 735g, 735h to change a dimension of the ROI to create a new ROI. In turn, the processing unit can select a subset of voxels representing the new ROI and can form and render an image 726 of the new ROI in the second window 725. In some embodiments, the GUI 710 can render some or all of the side projection image 727, end projection image 728, and ROI image 726 in response to selections of dimension of the ROI made by the user. In some embodiments, the user can use view rotation arrows 735a to rotate one or more of the side projection image 727 and the end projection image 728 in the first window 720. In some embodiments, the GUI 710 can provide the magnification button 735d and the demagnification button 735e to allow increase or decrease, respectively, in the magnification of the resizable ROI image 726. Similarly, the GUI 710 can provide the rotation button 735f to allow the viewer to rotate the orientation of the resizable ROI image 726.

In some embodiments, the GUI 710 can enable a user to tag a region within the image of the ROI that corresponds to an item of interest. For example, a user might identify contraband 750 within an ROI and wish to tag the location of the contraband 750 within the object. In some embodiments, the tagged region can be identified by the user by dragging a bounding box 752 to define the tagged region. Once the tagged region has been defined, the GUI 710 in some embodiments can render, using a graphic unit, an image of the tagged region. In some embodiments, the GUI 710 can save, in a memory, data related to the location of the tagged region within the object.

To evaluate the imaging improvements taught herein, the systems, methods, and non-transitory computer-readable media as taught herein were used to generate images of the object that includes multiple items including contraband 750. The object was scanned using an x-ray computed tomography (CT) system with a rotating gantry as described below. Measurement data collected by the CT system was reconstructed into a three-dimensional array of voxels.

Figure 10:
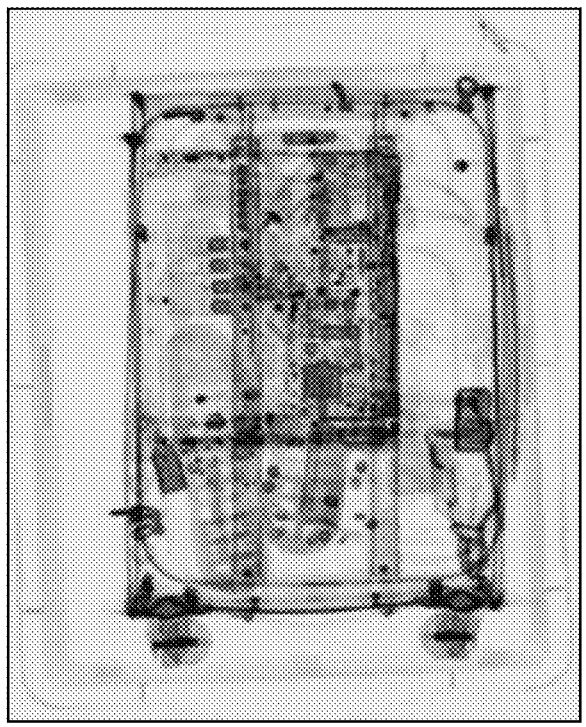
FIG. 10 illustrates a conventional prior art full projection image of an object including contraband.
Figure 12:
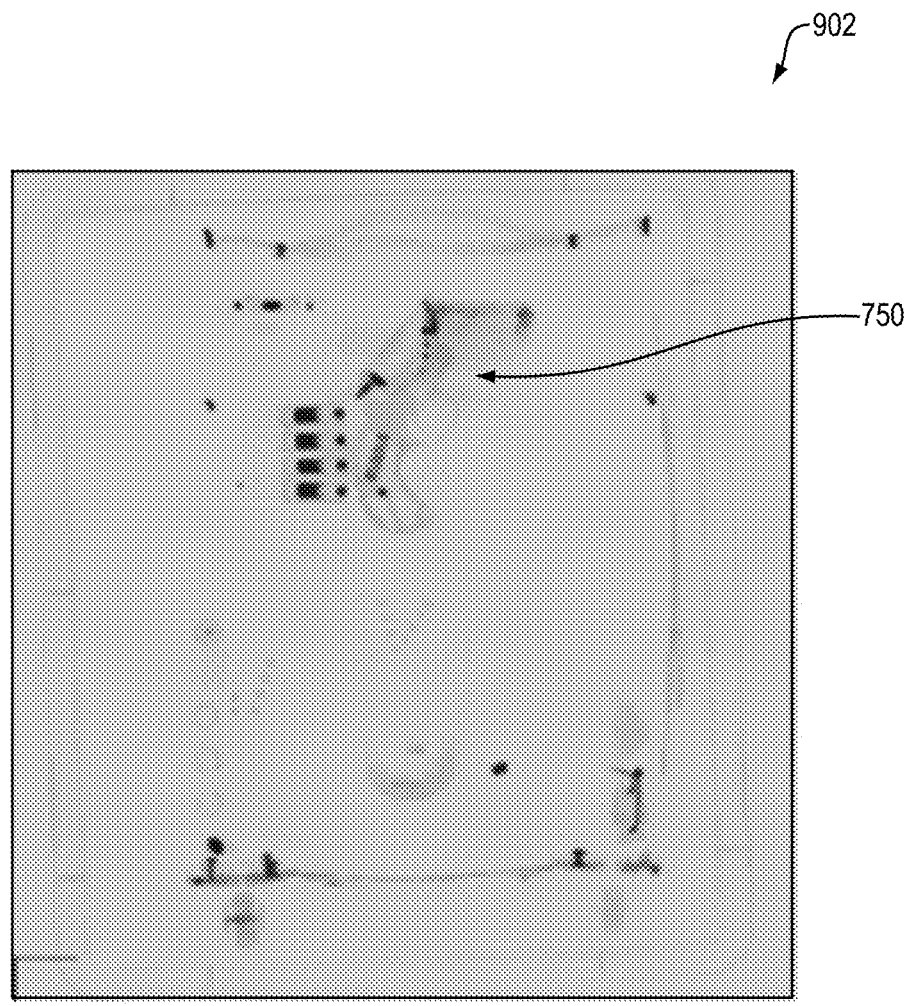
FIG. 12 illustrates an image of a region of interest of the object of FIGS. 10 and 11 including the contraband as taught herein.

FIGS. 10-12 were generated from the same three-dimensional array of voxels along the same view direction. FIGS. 10 and 11 depict a conventional full projection image and a conventional single-slice projection image of the object, respectively. FIG. 12 depicts an image of an ROI including the contraband 750 rendered in accordance with the principles taught herein.

In FIG. 10, a full projection image 900 was generated by summing the data values along the view direction for all voxels in the three-dimensional array of voxels. By summing data values for the entire array of voxels, items included in the object that are "above" or "below" one another along the view direction overlap in the resulting projection image. Thus, the resulting image is cluttered, and individual items included in the object require significant time, attention, and training for a user to identify. The image of FIG. 10 is inadequate when used in a security context because of the operational context of reviewing many passenger bags under time pressure.

FIG. 11 is a slice image 901 representing a single-slice projection through the object as described above with reference to FIG. 1. The image was generated by selecting voxels from the array of voxels that all lie in a plane perpendicular to the view direction. By selecting voxels from a single image slice of the array of voxels, items included in the object are often unidentifiable because their shape in the image is not necessary indicative of their true shape. As a result, a human viewer requires significant time, attention, and training when viewing images representing single slices of the object. The slice image 901 is inadequate when used in a security environment because of the operational context of reviewing many objects, for example passenger bags, freight, and the like, under time constraints. In addition, the array of voxels in this instance can be represented by hundreds of image slices. Stepping through hundreds of images for each object would be excessively burdensome for a viewer in a security environment.

FIG. 12 is an ROI image 902 formed by processing a selected subset of voxels representing a plurality of image slices of the array of voxels representing the object as discussed above in relation to FIGS. 2-5. For the ROI image 902, the subset of voxels represents approximately twenty-four image slices. The subset of voxels was processed by summing the data of the object in the direction parallel to the view direction. As shown, the full outline of the contraband 750 is readily visible in ROI image 902 and would immediately be recognizable to a machine or human viewer.

ROI image 902 and slice image 901 are images of the same article of contraband 750. Slice image 901 represents a single slice of data through the object. ROI image 902 represents an ROI of the object formed from a plurality of slices of data through the object. Image 902 is formed from a selected subset of voxels representing an ROI and includes voxels from about twenty-five image slices.

FIG. 13 is a block diagram of an exemplary computing device 140 that may be used to implement exemplary embodiments of the image reconstruction systems, methods, and non-transitory computer-readable media described herein. Descriptions and elements of the computing device 140 below may be applicable to any computing device described above with reference to previous embodiments. The computing device 140 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 1106 included in the computing device 140 may store computer-readable and computer-executable instructions or software for implementing exemplary embodiments of the imaging system 1000. The computing device 140 also includes the configurable or programmable processing unit 145 and associated core(s) 1104 and may include one or more additional configurable or programmable processor(s) 1102' and associated core(s) 1104' (for example, in the case of computer systems having multiple processors or cores), for executing computer-readable and computer-executable instructions or software stored in the memory 1106 and other programs for controlling system hardware. Processor 145 and processor(s) 1102' may each be a single core processor or multiple core (1104 and 1104') processor.

Virtualization may be employed in the computing device 140 so that infrastructure and resources in the computing device may be shared dynamically. A virtual machine 1114 may be provided to handle a process running on multiple processors so that the process appears to be using only one computing resource rather than multiple computing resources. Multiple virtual machines may also be used with one processor.

Memory 1106 may include a read-only memory or random access memory, such as DRAM, SRAM, EDO RAM, and the like. Memory 1106 may include other types of memory as well, or combinations thereof. In some embodiments, the memory 1106 can be used to store measurement data 1105 or the three-dimensional array of voxels 200, 300, 400, 500.

A user may interact with the computing device 140 through the display 142, such as a computer monitor, onto which the graphic unit 146 may display one or more GUIs 710 provided in accordance with exemplary embodiments. The computing device 140 may include other I/O devices for receiving input from a user, for example, a keyboard or any suitable multi-point touch interface 1108, a pointing device 1110 (e.g., a mouse), a microphone 1128, or an image capturing device 1132 (e.g., a camera or scanner). The multi-point touch interface 1108 (e.g., keyboard, pin pad, scanner, touch-screen, etc.) and the pointing device 1110 (e.g., mouse, stylus pen, etc.) may be coupled to the display 142. The computing device 140 may include other suitable conventional I/O peripherals.

The computing device 140 may also include one or more storage devices 1124, such as a hard-drive, CD-ROM, or other computer readable media, for storing data and computer-readable instructions or software that implement exemplary embodiments of the imaging system 1000. For example, the storage 1124 can store one or more implementations of direct reconstruction executable codes 1123, iterative reconstruction executable codes 1125, or image processing executable codes 1127 that are further discussed above in connection with FIG. 9. Exemplary storage device 1124 may also store one or more databases for storing any suitable information required to implement exemplary embodiments. For example, exemplary storage device 1124 can store one or more databases 1126 for storing information, such as transport system speed, items scanned, number of alarm triggers, sensor information, system geometry, x-ray source calibration, time since last system maintenance, lifetime usage, or any other information to be used by embodiments of the system 1000. The databases may be updated manually or automatically at any suitable time to add, delete, or update one or more data items in the databases.

The direct reconstruction code 1123 includes executable code and other code to cause the processing unit 145 to implement one or more of the direct reconstruction techniques taught herein. The iterative reconstruction code 1125 includes executable code and other code to cause the processing unit 145 to perform one or more of the iterative reconstruction methodologies taught herein. The image processing code 1127 includes executable code and other code to cause the processing unit 145 to form or render an image of the ROI of the object as taught herein, for example, as illustrated and described with reference to FIGS. 2-6. Although viewed as separate structures in storage 1124, one or more of the direct reconstruction code 1123, the iterative reconstruction code 1125, and the image processing code 1127 may be implemented as a single module or routine.

The computing device 140 can include a network interface 1112 that can be used to transmit or receive data, or communicate with other devices, in any of the exemplary embodiments described herein. Network interface 1112 can be configured to interface via one or more network devices 1120 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (Wi-Fi, 3G, 4G, Bluetooth®), controller area network (CAN), or some combination of any or all of the above. In exemplary embodiments, the computing device 140 can include one or more antennas 1130 to facilitate wireless communication (e.g., via the network interface) between the computing device 140 and a network. The network interface 1112 may include a built-in network adapter, network interface card, PCMCIA network card, card bus network adapter, wireless network adapter, USB network adapter, modem or any other device suitable for interfacing the computing device 140 to any type of network capable of communication and performing the operations described herein. Moreover, the computing device 140 may be any computer system, such as a workstation, desktop computer, server, laptop, handheld computer, tablet computer (e.g., the IPAD™ tablet computer), mobile computing or communication device (e.g., the IPHONE™ communication device), internal corporate devices, or other form of computing or telecommunications device that is capable of communication and that has sufficient processor power and memory capacity to perform the operations described herein.

The computing device 140 may run any operating system 1116, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1116 may be run in native mode or emulated mode. In an exemplary embodiment, the operating system 1116 may be run on one or more cloud machine instances.

As discussed above, the formation of an ROI image as taught herein from a subset of voxels in an array of voxels is not dependent on the type or configuration of the system that collected the measurement data from which the array of voxels is derived. Applicable systems can include medical systems, cargo scanning systems, or any other imaging modality that generates a three-dimensional array representation of an object. The concepts taught herein to select and render an image of an ROI of an object can be applied across known systems with little or no change to the detectors and radiation sources. A range of exemplary systems will now be described that are compatible with teachings presented herein.

Imaging systems in accordance with embodiments of the present disclosure can include an imaging apparatus to acquire measurement data of the object. The imaging systems can further include a programmable processing unit having a central processing unit, communicatively coupled to a memory.

The imaging apparatus in some embodiments can be an x-ray CT system. The x-ray CT system can have a moving x-ray source or a stationary x-ray source configured to irradiate at least a portion of the object. In some embodiments, the moving x-ray source can be disposed on a rotating gantry.

Figure 14:
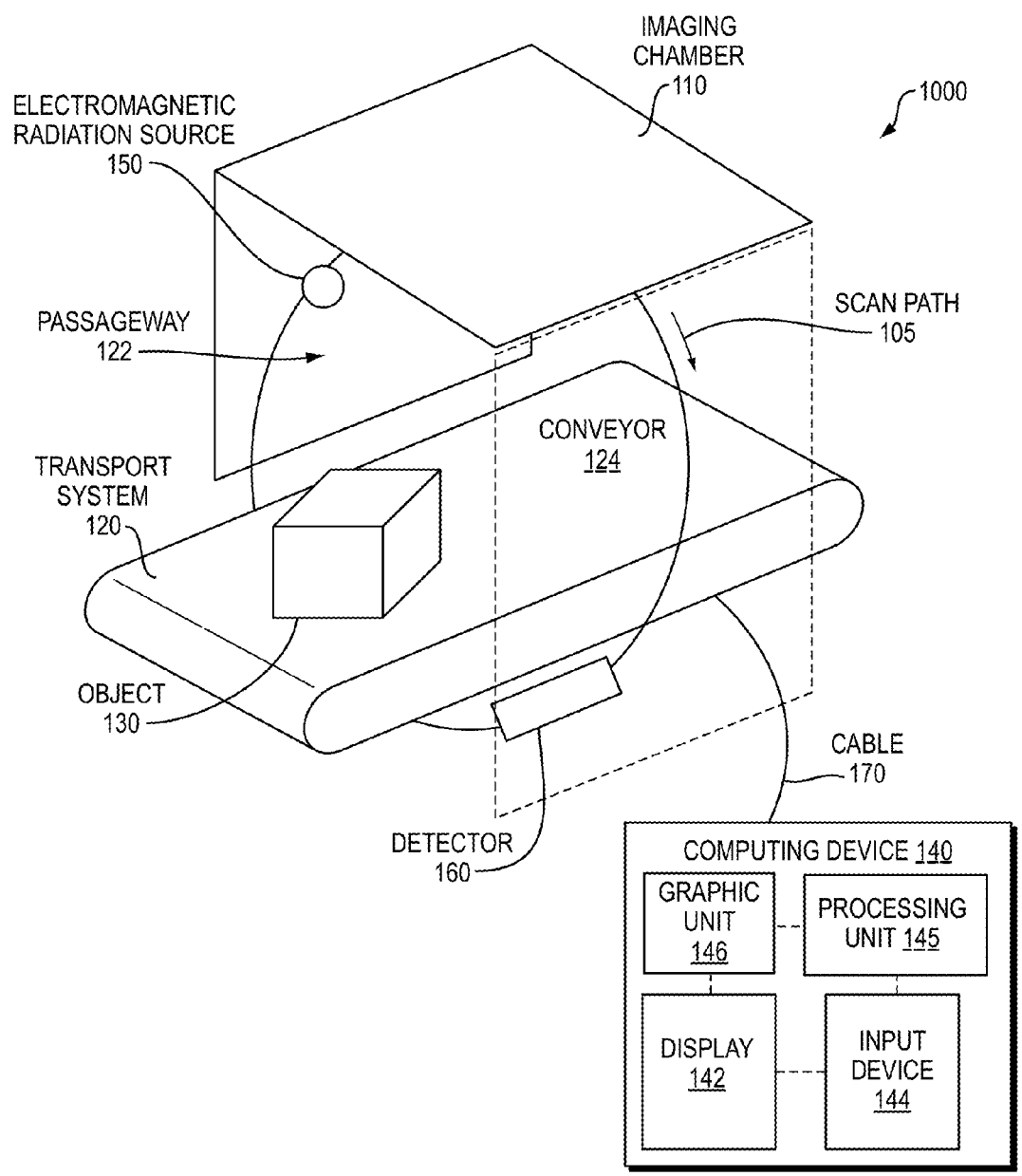
FIG. 14 illustrates an exemplary system for acquiring measurement data of an object and generating projection images of portions of the object in accordance with some embodiments of the present disclosure.

FIG. 14 illustrates an exemplary imaging system 1000 for forming and rendering projection images of at least a portion of an object 130, according to one embodiment of the present disclosure. The imaging system 1000 includes an imaging chamber 110, a transport system 120 to transport the object 130, a computing device 140, an x-ray source 150, and a detector 160. The imaging chamber encloses a passageway 122. The computing device 140 can include a display 142, an input device 144, a processing unit 145, and a graphic unit 146. The computing device 140 can be used to render images of one or more ROIs as taught herein, the GUI 710, and other interfaces on the display 142 using the graphic unit 146.

The transport system 120 can be configured to transport the object 130 through at least a portion of the passageway 122 of the imaging chamber 110. In accordance with various embodiments, the transport system 120 can include an object transport mechanism such as, but not limited to, a conveyor belt 124, a series of rollers, or a cable that can couple to and pull an object 130 into the imaging chamber 110. The transport system 120 can be configured to transfer the object 130 into the passageway 122 of the imaging chamber 110 at a range of speeds. The transport system 120 can transport the object 130 at any speed that allows collection of measurement data of the object 130.

The x-ray source 150 can be configured to emit a conical beam of x-ray radiation (or gamma rays, or other radiation) at a plurality of points along a trajectory around the conveyor 124 on a scan path 105 relative to a direction of transport of the object 130, to irradiate at least a portion of the object 130. In some embodiments, the trajectory around the conveyor 124 on the scan path 105 relative to the direction of transport of the object 130 can be less than or greater than 180°. In some embodiments, the source 150 can emit gamma rays. The detector 160 can be configured to detect measurement data indicative of an interaction of the x-ray radiation with the portion of the object 130. The detector 160 is disposed relative to the x-ray source 150 to detect the measurement data along the scan path 105. In some embodiments, the source 150 and detector 160 can have a fixed spatial relationship and may rotate about a longitudinal axis of the imaging system 1000 as, for example, on a gantry. In some embodiments, one or more sources 150 and detectors 160 can be fixed with respect to the transport system 120. In some embodiments, the positions of the x-ray source 150 and detector 160 can be fully known as a function of time during scanning of the object 130.

The computing device 140 includes at least one processing unit 145 including at least one central processing unit (CPU). The computing device 140 can be configured to receive measurement data acquired by the detector 160. The processing unit 145 is programmable to execute processor-executable instructions such as image processing executable code to form projection images of portions of the object 130 as described in greater detail above.

The central processing unit is programmable to compute a reconstructed three-dimensional array of voxels representative of the object 130 by applying at least one iteration of an iterative reconstruction to the measurement data to derive the reconstructed three-dimensional array of voxels. In some embodiments, the programmable processing unit can execute image processing code 1127 to receive the three-dimensional array of voxels representing the object upon execution of processor-executable instructions. Execution of the image processing code 1127 allows a user to select an ROI of the object from a projection image. Based on the selected ROI, the image processing code 1127 selects a subset of voxels from the array of voxels representative of the selected ROI. The subset of voxels represents one or more portions of a plurality of image slices of the object and is selected along a direction perpendicular to a view direction defined by the ROI. Execution of the image processing code 1127 can form an image of the ROI by processing the subset of voxels. The computing device 140 and the processing unit 145 are discussed in greater detail with respect to FIG. 13.

The computing device 140 including the processing unit 145 can be configured to exchange data, or instructions, or both data and instructions, with at least one of the other components of the imaging system 1000 wirelessly or via one or more wires or cables 170. As an example, the computing device 140 including the processing unit 145 can communicate with the x-ray source 150 or the detector 160 to control the operation of each and receive measurement data from the detector 160. The computing device 140 including the processing unit 145 can receive measurement data that is representative of a volume of the object 130 and can be configured or programmed to apply at least one iteration of an iterative reconstruction to the measurement data to derive the three-dimensional array of voxels. In some embodiments, the computing device 140 can be configured to receive detector orientation data that correlates to the instantaneous location of the detector 160 with respect to the object 130. Detector orientation data can be provided by location sensors located at or near the source 150, detector 160, or scan path 105 or can be calculated based upon other geometrical quantities of the imaging system 1000. In some embodiments, the detector orientation data can be encoded directly into the measurement data.

The graphic unit 146 can be configured to render an image of an ROI, for example, ROI image 902 from the three-dimensional array of voxels 200, 300, 400, 500 on the display 142. The graphic unit 146 can render a user interface on the display 142 to allow a user of the imaging system 1000 to interact with the user interface of the computing device 140 with an input device 144. In some embodiments, the user interface is a GUI 710 as described, for example, in relation to FIGS. 8 and 9. The input device 144 can be a keyboard, a mouse, a trackball, a touchpad, a stylus, a touchscreen of the display 142 or any other suitable device that allows a user to interface with the computing device. In some embodiments, the GUI 400 can be rendered on a touchscreen to allow a user to input information or data via the touchscreen.

The imaging chamber 110 may be made of appropriate metal or plastic materials that allow the desired spacing and orientation of the x-ray source 150 and the detector 160 relative to the object 130. In some embodiments, the imaging chamber 110 may include radiation stopping or absorbing material such as lead.

The object 130 to be imaged can enter the imaging chamber 110 through the passageway 122. The size of the passageway 122 may be of any shape that meets application-specific requirements. For example, the passageway 122 may be configured with a passageway sized to allow the transport of hand-carry luggage, checked luggage, cargo, shipping containers, or any other type of object. The passageway 122 may be configured with any geometric conformation. As non-limiting examples, the passageway 122 can have a circular cross-section, a square cross-section, a rectangular cross-section, a hexagonal cross-section, an oval cross-section, or other polygonal-shaped cross-section. In another example, passageway 122 can have an irregularly-shaped cross-section.

The imaging chamber 110 can house one or more x-ray sources 150 and detectors 160. In accordance with various embodiments, the x-ray source 150 may be an x-ray source or a gamma ray source. The x-ray source(s) 150 can be configured to emit a cone-beam of radiation to interact with the object 130, and the detectors 160 can be configured to detect radiation indicative of an interaction of the radiation with any portion of the object. As a non-limiting example, the detector 160 can detect attenuated radiation that has passed through a portion of the object 130. In some embodiments, the x-ray source 150 and detector 160 can move cooperatively along a circular scan path that may be defined relative to the motion of an object 130 to form a helical cone beam. For example, the scan path may be a partial or complete circle of constant radius where the object 130 travels along a line passing through a central portion of the circle. The x-ray source 150 of some embodiments can include a high-energy electron beam and an extended target or array of targets. In some embodiments, imaging systems as taught herein can have more than one source and detector.

In some embodiments, the detector 160 may be configured with multiple detector elements in a detector array.

The processing unit 145 can be configured to generate the three-dimensional array of voxels representing the object from the radiation detected by the detectors 160 using any suitable image reconstruction methodology. Examples of direct reconstruction techniques that may be used to reconstruct the three-dimensional array of voxels in some embodiments include a filtered back-projection methodology, an analytical cone-beam methodology, an approximate cone-beam methodology, a Fourier reconstruction methodology, an extended parallel back-projection methodology, a filtered back-projection with dynamic pitch methodology, a pi-line-based image reconstruction methodology, a Feldkamp-type reconstruction methodology, a tilted-plane Feldkamp-type reconstruction methodology, or any other direct reconstruction technique that meets application-specific requirements.

Iterative reconstruction techniques may also be employed in the system 1000 to reconstruct the three-dimensional array of voxels representing the object. Examples of iterative reconstruction techniques include a simultaneous algebraic reconstruction technique (SART), a simultaneous iterative reconstruction technique (SIRT), an ordered subset convex technique (OSC), ordered subset maximum likelihood methodologies, an ordered subset expectation maximization (OSEM) methodology, an adaptive statistical iterative reconstruction technique (ASIR) methodology, a least squares QR methodology, an expectation maximization (EM) methodology, an OS-separable paraboloidal surrogates technique (OS-SPS), an algebraic reconstruction technique (ART), a Kacsmarz reconstruction technique, or any other iterative reconstruction technique or methodology that meets application-specific requirements. In some embodiments, a sparse matrix or a compressed sensing technique can be used to increase the speed of the reconstruction.

In the implementation of an iterative reconstruction technique, an initial state is defined before successive iterative steps are performed. When initialized using an empty or uniform set, an iterative reconstruction technique may perform many iterations before achieving convergence. Each iteration step is computationally intensive, so conducting many iteration steps can unacceptably increase the total time for data reconstruction. Reducing the numbers of iterations to achieve a solution can greatly increase the speed and efficiency of the image reconstruction computation. In accordance with various embodiments, the process of iterative reconstruction can be initialized using the output from a direct reconstruction technique including, but not limited to, a filtered back-projection methodology. The use of output from a direct reconstruction technique can significantly reduce the number of iterations to reach convergence and speed up total processing time.

In accordance with various embodiments, measurements obtained from a detector 160 may be used by the processing unit 145 to reconstruct a three-dimensional (i.e., volumetric) array of voxels representing properties of the object 130. Data included in the three-dimensional array of voxels can represent one or more properties of the object 130 being imaged, which may be under inspection to identify contraband 750. For example, the radiation emitted by the x-ray source 150 may attenuate as it passes through a portion of the object 130 before impinging on a detector 150. This attenuation is proportional to the density of the portion of the object 130 through which it traveled. Accordingly, data in the three-dimensional array of voxels can represent information about the density of the portion of the object. In another embodiment, radiation at two different energy levels may be directed such that they pass through a portion of the object 130. The ratio of the attenuation between beams at two different energy levels can provide information about the atomic number or elemental composition of the portion of the object 130. The system 1000 according to the principles taught herein may be configured to compute data in the three-dimensional array of voxels corresponding to the density, or atomic number, or both density and atomic number properties, of a portion of the volume of the object 130. In various embodiments, measurement data or reconstructed images or representations may be stored and retrieved for analysis at a later date or may be displayed to a user on the display 142. In some embodiments, the measurement data collected at the detector 150 may be interpolated onto a virtual array or interpolation may be used to modify or replace data values associated with malfunctioning or missing detector positions.

Figure 15:
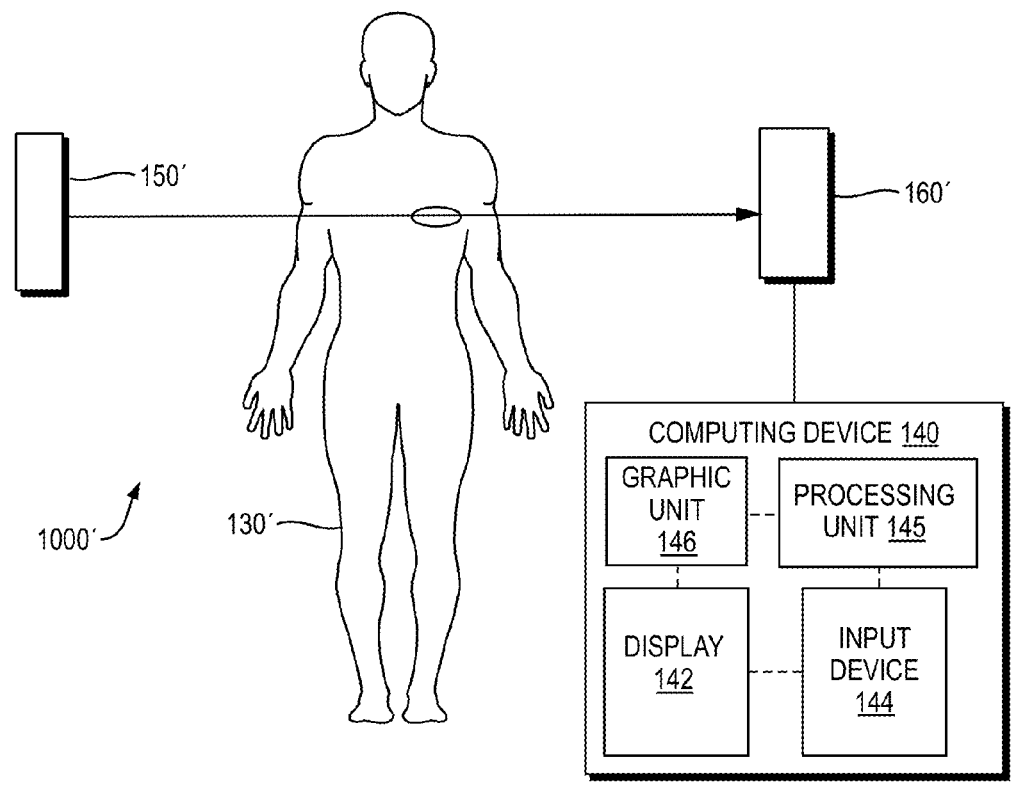
FIG. 15 illustrates an exemplary system for acquiring measurement data of an object and generating projection images of portions of the object in accordance with some embodiments of the present disclosure.
Figure 16:
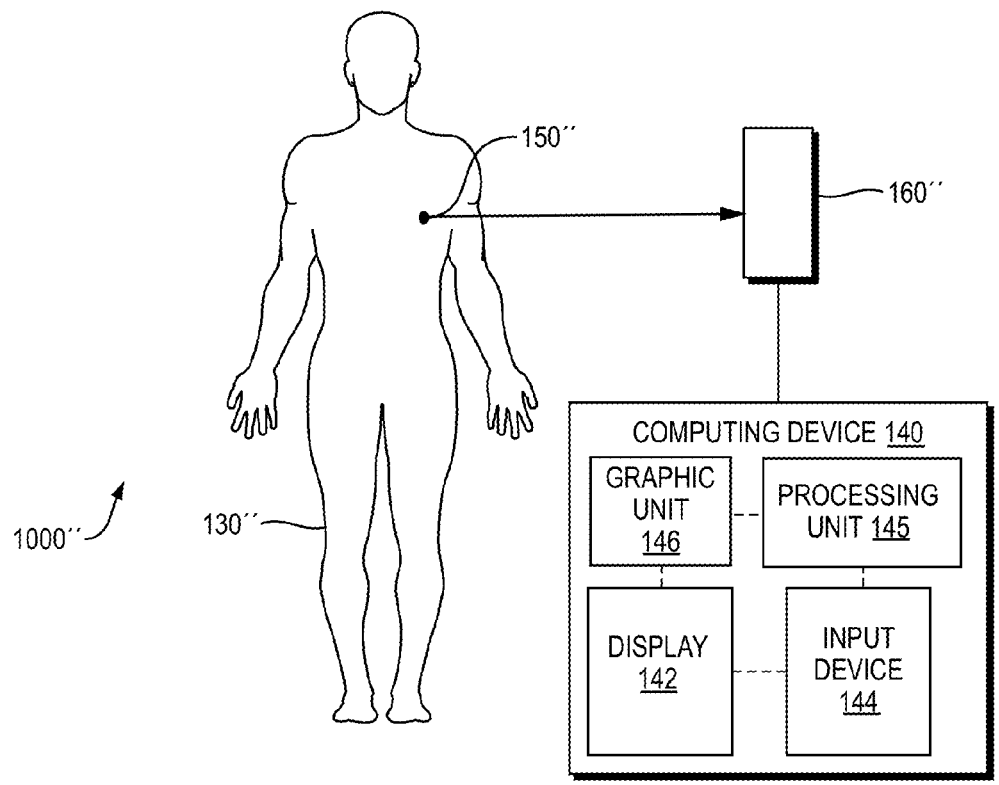
FIG. 16 illustrates an exemplary system for acquiring measurement data of an object and generating projection images of portions of the object in accordance with some embodiments of the present disclosure.
Figure 17:
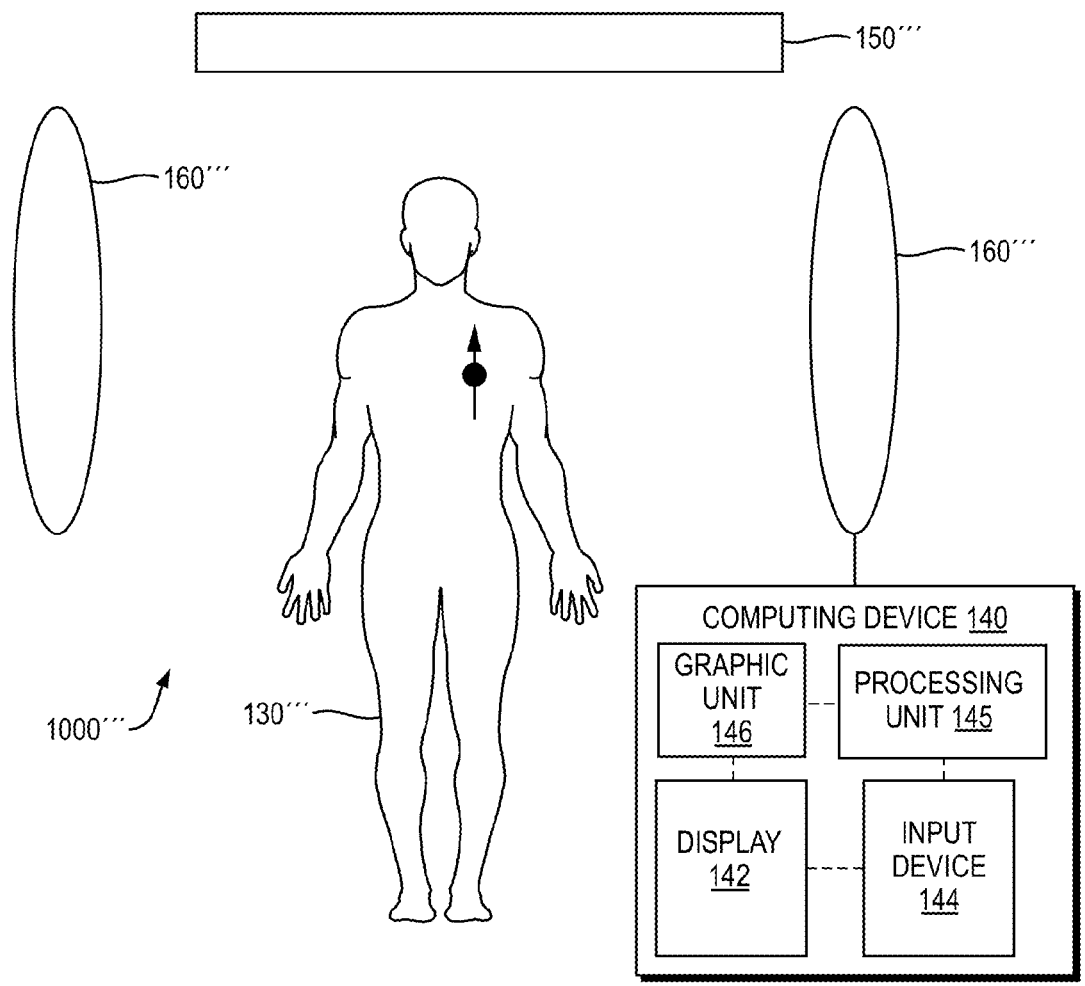
FIG. 17 illustrates an exemplary system for acquiring measurement data of an object and generating projection images of portions of the object in accordance with some embodiments of the present disclosure.

FIGS. 15-17 depict systems for acquiring measurement data of the object and generating images of ROIs of the object in accordance with the teachings herein. In these embodiments, the object 130' can be a biological organism. The systems of FIGS. 15-17 can generate and process measurement data to create three-dimensional volumetric or two-dimensional projection images of an ROI included in the object 130'. In some embodiments, the ROI can include an organic or inorganic structure within the biological organism.

FIG. 15 depicts a system 1000' that includes a source 150', a detector 160', and the computing device 140. The computing device can include the graphic unit 146, the processing unit 145, the display 142, and the input device 144. The source 150' can emit radiation that can interact with the object 130' and then be detected by the detector 160'. The detector 160' can generate measurement data based on the received radiation that is indicative of the interaction of the radiation with the object 130'.

In some embodiments, the source 150' can be an x-ray source similar to the system described above with reference to FIG. 14. For example, the source 150' can be the x-ray source of a medical computed tomography (CT) system. In some embodiments, the source 150' can emit other forms of penetrating or non-penetrating radiation such as gamma rays, microwave radiation, infrared radiation, visible radiation, ultraviolet radiation, or any other suitable form of radiation.

The source 150' can be configured to emit a cone-beam of radiation to interact with the object 130', and the detector(s) 160' can be configured to detect radiation indicative of an interaction of the radiation with any portion of the object. As a non-limiting example, the detector 160' can detect attenuated radiation that has passed through a portion of the object 130'. In some embodiments, the source 150' and detector 160' can move cooperatively along a circular scan path that may be defined relative to the motion of an object 130' to form a helical cone beam. For example, the scan path may be a partial or complete circle of constant radius where the object 130' travels along a line passing through a central portion of the circle. The x-ray source 150' of some embodiments can include a high-energy electron beam and an extended target or array of targets. In some embodiments, imaging systems as taught herein can have more than one source and detector.

In some embodiments, the detector 160' may be configured with multiple detector elements in a detector array. In some embodiments, the detector 160' can be configured to detect radiation backscattered or reflected from the object 130' rather than radiation transmitted through the object 130'.

FIG. 16 depicts a system 1000" including a source 150", a detector 160", and the computing device 140. The computing device can include the graphic unit 146, the processing unit 145, the display 142, and the input device 144. In accordance with some embodiments, the source 150" can be located within the object 130".

In some embodiments, the source 150" can be configured to emit a variety of fundamental particles and waves including alpha particles, beta particles, gamma particles, positrons, muons, electrons, or photons from within the object 130". In some embodiments, the source 150" can emit a first particle or wave that can convert into a second particle or wave that is then detected by the detector 160". For example, the source 150" can include radionuclides that emit positrons as in positron emission tomography. The positrons can recombine with electrons to release gamma rays that are then detected by the detector 160". In another embodiment, the source 150" can emit light that is converted by interaction with the object 130" into an acoustic signal as in photo- or optoacoustic imaging. The detectors 160" in this embodiment can be ultrasonic transducers that receive the acoustic signal to produce measurement data.

In some embodiments, the detector 160" may be configured with multiple detector elements in a detector array. In some embodiments, multiple detectors 160" in an array can be placed around the object 130" to receive particles or waves emitted directly or indirectly by the source 150" within the object 130". In some embodiments, the computing device 140 can use techniques such as time-of-flight to determine a position of the source 150" within the object 130" based on measurement data received at different times by the detectors 160" in the detector array.

FIG. 17 depicts a system 1000''' including a source 150''', a detector 160''', and the computing device 140. The computing device can include the graphic unit 146, the processing unit 145, the display 142, and the input device 144. In accordance with some embodiments, the source 150''' can stimulate or perturb a portion of the object 130''' in a way that can be detected by the detector 160'''.

In some embodiments, the source 150''' can be an electromagnet or permanent magnet. In these embodiments, the source 150''' can operate to stimulate or perturb all or a portion of the object 130''' by applying a large magnetic field to the object to excite or align the nuclear spins of constituent components of the object 130''' such as hydrogen atoms. The source 150''' can apply a magnetic field that varies in space and time in some embodiments.

In some embodiments, the detector 160''' may be configured with multiple detector elements in a detector array. The detector 160''' can include magnetic coils that can detect radio frequency signals emitted by excited constituents of the object 130''' such as hydrogen atoms. In some embodiments, the computing device 140 can control the operation of the source 150''' and detector 160''' to correlate measurement data with spatial locations within or around the object 130'''.

As described above, the source and detector of systems to generate measurement data according to embodiments taught herein can have a number of relationships. In some embodiments, the source and detector can have a fixed spatial relationship and, for example, may rotate about a longitudinal axis of the imaging system as, for example, on a gantry. In some embodiments, one or more sources and detectors can be fixed in space or relative to the motion of an object during imaging.

Figure 18A:
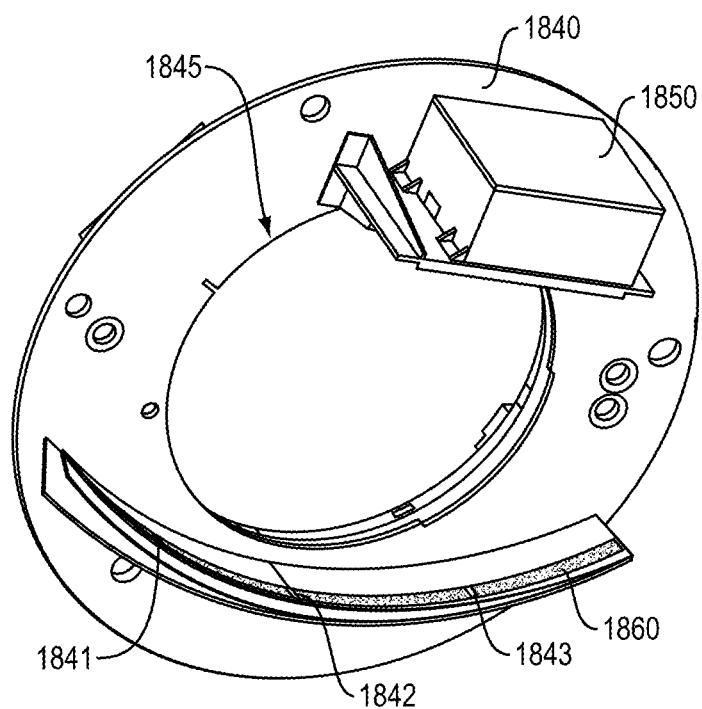
FIGS. 18A and 18B illustrate views of example gantry systems, according to embodiments of the present disclosure.
Figure 18B:
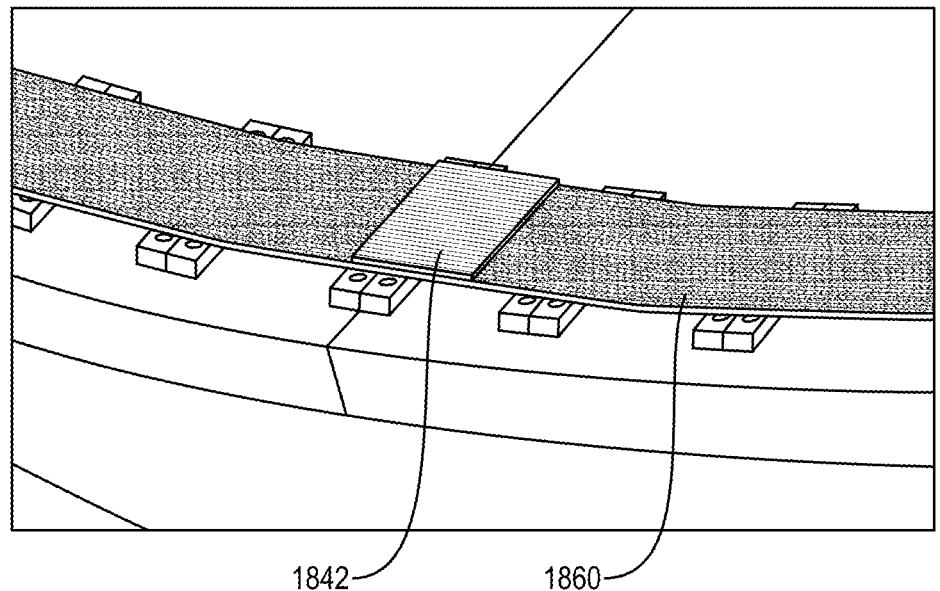

An example rotating gantry according to various embodiments is depicted in FIGS. 18A and 18B. The gantry 1840 includes an opening or central bore 1845 through which objects may pass in connection with a transport system as discussed above with reference to FIG. 14. The x-ray source 1850 may be located on the gantry 1840, and the detector array 1860 may be located substantially opposite the x-ray source 1850 across the opening.

In some embodiments, a coating such as a metal foil 1841, 1842, 1843 can be overlaid on one or more elements of the detector array 1860. The coated elements 1841, 1842, 1843 may be sensitive to different radiation energy than the exposed elements. With these secondary energy detector elements interpolated within the main detector array 1860, embodiments taught herein may be capable of measuring volume properties such as atomic number or elemental composition. The introduction of secondary energy detector elements can leave gaps in the dataset when performing a volumetric data reconstruction for a property that requires low energy radiation such as density. The gaps in the volumetric data may be filled by interpolation of neighboring values, averaging, or by any other suitable method.

Figure 19:
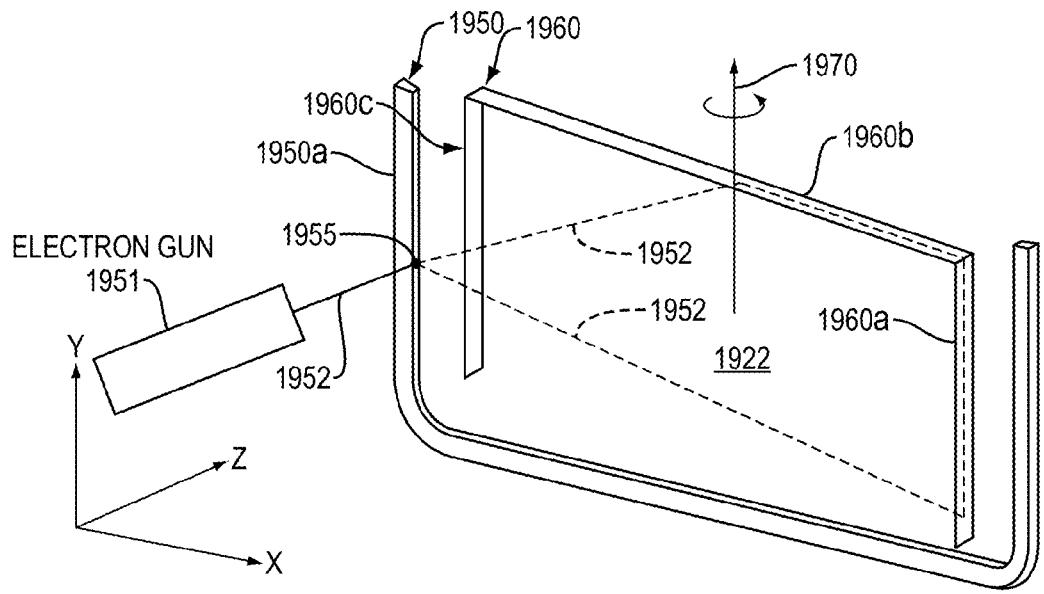
FIG. 19 illustrates an example x-ray source and detector geometry and relationship for systems and devices, according to some embodiments of the present disclosure.

FIG. 19 illustrates an x-ray source target 1950 and a detector array 1960 geometry and relationship according to some embodiments. In some embodiments, the x-ray source target 1950 is activated by a high-energy electron beam 1952 from an electron source 1951. For example, an e-beam 1952 can be directed to impinge on target 1950, which responds by emitting x-rays in 4π directions. Collimators (not shown) may be used to form the emitted radiation into a fan beam, cone beam, pencil beam, or other shaped beam as dictated by application-specific requirements. The shaped beam of radiation enters an examination region 1922 through which an object passes. A detector array 1960 may be located diametrically opposite to the radiation emission point and can respond to the attenuated beam of radiation. For example, the detectors along arms 1960a and 1960b of the detector array 1960 detect x-rays in the fan beam generated along arm 1950a, for example, fan beam 1952 emitted by x-ray source location 1955. In accordance with various embodiments, the plane defined by the detector array can be rotated by an angle 1970 with respect to the plane defined by the x-ray source target 1950. Rotation by an angle 1970 can help to avoid a situation in which x-rays emitted from the x-ray source target 1950 are blocked by an arm of the detector array before passing through the examination region 1922. For example, radiation emitted at location 1955 will be blocked on the outer surface of detector arm 1960c if the rotation angle 1970 is zero. By introducing a non-zero rotation angle 1970, radiation is free to pass into the examination region 1922 before impinging on detector arms 1960a and 1960b as described above. The electron beam 1952 can be steered to control and sweep the x-ray source target 1950 including location 1955. In example embodiments where the x-ray source target 1950 includes multiple targetable elements, the scanning electron beam 1952 can be further configured to irradiate some or all of the targetable elements. In some embodiments, a multitude of targetable elements may be disposed at angles along a trajectory of at least 180° about the direction of transport of an object.

The x-ray source target 1950 and detector array 1960 are suitable for use in the imaging system 1000. In this embodiment, the beam of electrons 1952 from the electron source 1951 is swept across the surface of the x-ray source target 1950 to cause emission of x-rays over an angular range of less than 180° or at least 180° about the direction of transport of the object 130. Likewise, the speed of transport of an object relative to the scanning speed of the electron beam to cause emission of x-rays from the x-ray source target 1950 is controlled to provide an imaging modality with a pitch approximately equal to 1 or greater than 1.

Figure 20:
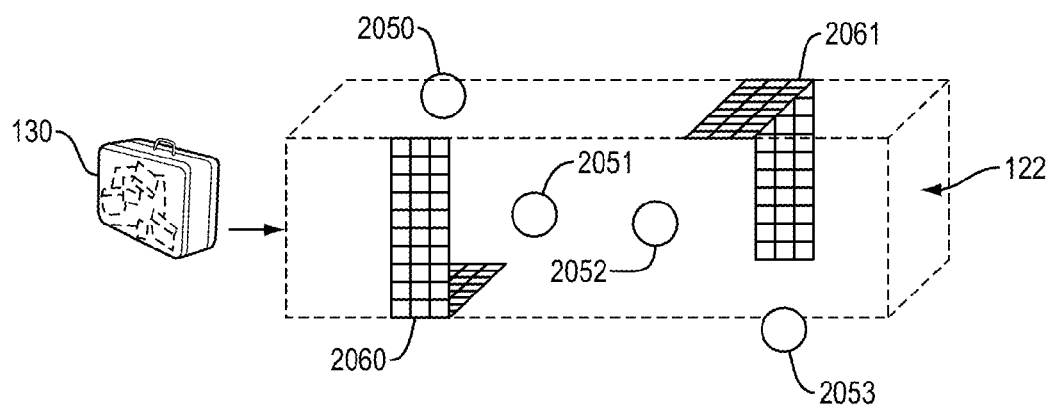
FIG. 20 illustrates an example x-ray source and detector geometry and relationship for systems and devices, according to some embodiments of the present disclosure.

FIG. 20 illustrates an example x-ray source and detector geometry according to some embodiments taught herein. In some embodiments, the x-ray source and detector are both fixed in location and do not rotate. As shown in FIG. 20, a detector array 2060 may have multiple segments that form an L-shape or staple shape to cover a greater complement of angles around an object 130. In some exemplary systems, multiple detectors 2060, 2061 can be included within a single system at different locations along the tunnel 122 traversed by the object 130. An exemplary system using fixed (i.e., non-rotating or moving) x-ray sources and detectors may include multiple x-ray sources 2050, 2051, 2052, 2053 that each emit radiation beams toward detectors 2060, 2061. The x-ray sources 2050, 2051, 2052, 2053 can be controlled such that only one x-ray source emits toward a given detector at any point in time so that the received measurement data can be properly associated with the correct x-ray source. Multiple x-ray sources 2050, 2051, 2052, 2053 may be skewed such that the range of angles between a given x-ray source and detector array is not duplicated by another x-ray source and detector combination. It will be apparent to one skilled in the art that any number of x-ray sources and detector arrays could be disposed within an imaging system to achieve any total angular coverage dictated by the specifics of the application. In accordance with various embodiments, the sources 2050, 2051, 2052, 2053 can be extended targets that emit x-rays when stimulated by a high energy electron beam as described above in relation to FIG. 19. In such embodiments, one or more fixed electron beam sources can be configured to irradiate positions along the extended targets. In some embodiments, each extended target can extend through a range of angles of less than 180°, at least 180°, or more than 180° about the direction of transport of an object.

The x-ray sources 2050, 2051, 2052, 2053 and detectors 2060, 2061 are suitable for use in the imaging system 1000. In this embodiment, the x-ray sources 2050, 2051, 2052, 2053 are controlled to emit and the detectors 2060, 2061 are controlled to receive x-rays over a range of angles of less than 180° or at least 180° about the direction of transport of the object 130. Likewise, the speed of transport of an object relative to the speed of the sequence of x-ray emission and detection is controlled to provide an imaging modality with a pitch approximately equal to 1 or greater than 1.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

The invention claimed is:

1. A method of forming an image of an object, comprising:
    receiving, using at least one processing unit, a three-dimensional array of voxels representing an object;
    selecting, using the at least one processing unit, a subset of voxels from the array representing a region of interest (ROI) of the object, the subset of voxels representing one or more portions of a plurality of image slices of the object, the subset of voxels selected along a direction perpendicular to a view direction defined by the region of interest; and
    forming an image of the ROI by processing the subset of voxels to at least sum data of the object included in the subset of voxels along the view direction.

2. The method of claim 1, further comprising rendering, using a graphic unit, the image of the ROI.

3. The method of claim 1, further comprising processing the image of the ROI using a computing device with a detection algorithm to detect a contraband item within the object.

4. The method of claim 1, wherein the array of voxels includes data of the object generated from measurement data obtained using a tomographic imaging technique.

5. The method of claim 1, wherein processing the subset of voxels to form the image of the ROI further includes averaging data of the object included in the subset of voxels along the view direction.

6. The method of claim 1, wherein processing the subset of voxels to form the image of the ROI includes:
    summing data of the object excluded from the subset of voxels along the view direction to create a first two-dimensional dataset;
    summing data of the object from all voxels along the view direction to create a second two-dimensional dataset; and
    subtracting the first two-dimensional dataset from the second two-dimensional dataset.

7. The method of claim 1, wherein processing the subset of voxels to form the image of the ROI includes:
    summing data of the object excluded from the subset of voxels along the view direction to create a first two-dimensional dataset;
    receiving a second two-dimensional dataset generated from measurement data obtained from x-rays detected by a detector that pass through the object as it moves along a direction of transport;
    subtracting the first two-dimensional dataset from the second two-dimensional dataset.

8. The method of claim 7, further comprising resampling the three-dimensional array of voxels from an orthographic coordinate system to a perspective coordinate system aligned with the view direction.

9. The method of claim 1, wherein a dimension of a voxel in the subset of voxels represents between 0.1 mm and 5 mm.

10. The method of claim 1, wherein the plurality of image slices of the object are all contiguous.

11. The method of claim 1, wherein the subset of voxels is a first subset of voxels and the ROI is a first ROI.

12. The method of claim 11, further comprising:
    selecting, using the at least one processing unit, a second subset of voxels from the array representing a second region of interest (ROI) of the object, the second subset of voxels representing one or more portions of a second plurality of image slices of the object, the second subset of voxels selected along a direction perpendicular to a view direction defined by the second ROI; and
    forming an image of the second ROI by processing the second subset of voxels.

13. The method of claim 12, wherein at least one voxel of the first subset of voxels is also included in the second subset of voxels.

14. The method of claim 13, wherein at least 50% of the voxels included in the first subset of voxels are also included in the second subset of voxels.

15. The method of claim 12, further comprising rendering, using a graphic unit, the image of the first ROI and the image of the second ROI on a display according to a user control.

16. The method of claim 15, wherein the image of the first ROI and the image of the second ROI are rendered at the same time.

17. The method of claim 15, wherein the image of the first ROI and the image of the second ROI are rendered at different times.

18. The method of claim 15, wherein the user control is rendered on a graphical user interface (GUI).

19. The method of claim 18, wherein the user control is any of a slider bar, a button, a gesture element responsive to a gesture, or a mouse control element.

20. The method of claim 1, wherein the view direction is selected by a user.

21. The method of claim 1, wherein a location of the region of interest is selected by a user.

22. The method of claim 1, further comprising rotating coordinate axes of the three-dimensional array of voxels to align with the view direction.

23. The method of claim 1, further comprising:
    determining an image slice that denotes an edge of the object; and excluding voxels beyond that slice from the subset of voxels.

24. The method of claim 23, wherein determining the image slice that denotes the edge of the object includes determining a slice at the edge of a sub-volume of the array of voxels that encompasses between 99% and 100% of a total sum of the data in the three-dimensional array of voxels.

25. The method of claim 1, further comprising:
receiving a tagged region within the image of the ROI corresponding to an item of interest; and
rendering, using the graphic unit, an image of the tagged region.

26. The method of claim 25, wherein the tagged region is identified by a user by dragging a bounding box to define the tagged region.

27. The method of claim 1, further comprising:
receiving a tagged region within the image of the ROI corresponding to an item of interest; and
saving, in a memory, data related to the location of the tagged region within the object.

28. The method of claim 27, wherein the tagged region is identified by a user by dragging a bounding box to define the tagged region.

29. An imaging system, comprising:
an imaging apparatus to acquire measurement data of an object; and
a programmable processing unit having a central processing unit, communicatively coupled to a memory, wherein upon execution of processor-executable instructions, the programmable processing unit operates to:
receive a three-dimensional array of voxels representing the object;
select a subset of voxels from the array representing a region of interest (ROI) of the object, the subset of voxels representing a subset of one or more portions of a plurality of image slices of the object, the subset of voxels selected along a direction perpendicular to a view direction defined by the ROI; and
form an image of the ROI by processing the subset of voxels to at least sum data of the object included in the subset of voxels along the view direction.

30. The imaging system of claim 29, wherein the programmable processing unit further executes instructions to render, using a graphic unit, the image of the ROI.

31. The imaging system of claim 29, wherein the programmable processing unit executes instructions to process the image of the ROI to detect a contraband item within the object of interest.

32. The imaging system of claim 29, wherein the imaging apparatus generates measurement data using a tomographic imaging technique.

33. The imaging system of claim 32, wherein the imaging apparatus includes an x-ray source to irradiate at least a portion of an object with a beam of x-ray radiation and a detector array to detect measurement data indicative of an interaction of x-rays with at least the portion of the object.

34. The imaging system of claim 33, wherein the programmable processing unit generates the three-dimensional array of voxels representing the object by applying a direct reconstruction technique, an iterative reconstruction technique, or both techniques to the measurement data.

35. The imaging system of claim 29, wherein the programmable processing unit receives the three-dimensional array of voxels from a memory.

36. The imaging system of claim 29, wherein processing the subset of voxels to form the image of the ROI further includes averaging data of the object included in the subset of voxels along the view direction.

37. The imaging system of claim 29, wherein processing the subset of voxels to form the image of the ROI includes:
summing data of the object excluded from the subset of voxels along the view direction to create a first two-dimensional dataset;
summing data of the object excluded from all voxels along the view direction to create a second two-dimensional dataset; and
subtracting the first two-dimensional dataset from the second two-dimensional dataset.

38. The imaging system of claim 29, wherein processing the subset of voxels to form the image of the ROI includes:
summing data of the object excluded from the subset of voxels along the view direction to create a first two-dimensional dataset;
receiving a second two-dimensional dataset generated from measurement data obtained from x-rays detected by a detector that pass through the object as it moves along a direction of transport;
subtracting the first two-dimensional dataset from the second two-dimensional dataset.

39. The imaging system of claim 38, wherein the programmable processing unit further operates to resample the three-dimensional array of voxels from an orthographic coordinate system to a perspective coordinate system aligned with the view direction.

40. The imaging system of claim 29, wherein a dimension of a voxel in the subset of voxels represents between 0.1 mm and 5 mm.

41. The imaging system of claim 29, wherein the plurality of image slices of the object are all contiguous.

42. The imaging system of claim 29, wherein the subset of voxels is a first subset of voxels and the ROI is a first ROI.

43. The imaging system of claim 42, wherein the programmable processing unit further executes instructions:
select, using the at least one processing unit, a second subset of voxels from the array representing a second region of interest (ROI) of the object, the second subset of voxels representing a subset of one or more portions of a plurality of image slices of the object, the second subset of voxels selected along a direction perpendicular to a view direction defined by the second ROI; and
form an image of the second ROI by processing the second subset of voxels.

44. The imaging system of claim 43, wherein at least one voxel of the first subset of voxels is also included in the second subset of voxels.

45. The imaging system of claim 44, wherein at least 50% of the voxels included in the first subset of voxels are also included in the second subset of voxels.

46. The imaging system of claim 43, wherein the programmable processing unit further operates to render, using a graphic unit, the image of the first ROI and the image of the second ROI on a display according to a user control.

47. The imaging system of claim 46, wherein the image of the first ROI and the image of the second ROI are rendered at the same time.

48. The imaging system of claim 46, wherein the image of the first ROI and the image of the second ROI are rendered at different times.

49. The imaging system of claim 46, wherein the user control is rendered on a graphical user interface (GUI).

50. The imaging system of claim 49, wherein the user control comprises any of a slider bar, a button, a gesture element responsive to a gesture, or a mouse control element.

51. The imaging system of claim 29, wherein the view direction is selected by a user.

52. The imaging system of claim 29, wherein a location of the region of interest is selected by a user.

53. The imaging system of claim 29, wherein the programmable processing unit further operates to rotate coordinate axes of the three-dimensional array of voxels to align with the view direction.

54. The imaging system of claim 29, wherein the programmable processing unit further operates to determine an image slice that denotes an edge of the object and excluding voxels beyond that slice from the subset of voxels.

55. The imaging system of claim 54, wherein determining the image slice that denotes the edge of the object includes determining a slice at the edge of a sub-volume of the array of voxels that encompasses between 99% and 100% of a total sum of the data in the three-dimensional array of voxels.

56. The imaging system of claim 29, wherein the programmable processing unit further operates to:
  receive a tagged region within the image of the ROI corresponding to an item of interest; and
  render, using the graphic unit, an image of the tagged region.

57. The method of claim 56, wherein the tagged region is identified by a user by dragging a bounding box to define the tagged region.

58. The imaging system of claim 29, wherein the programmable processing unit further operates to:
  receive a tagged region within the image of the ROI corresponding to an item of interest; and
  save, in a memory, data related to the location of tagged region within the object.

59. The imaging system of claim 58, wherein the tagged region is identified by a user by dragging a bounding box to define the tagged region.

60. A computer-implemented method comprising:
  rendering, on a display, a graphical user interface (GUI) window to display an image of an object;
  receiving, via one or more graphical user interface elements of the GUI, an identification of a region of interest in the object;
  in response to the identification of the region of interest, processing a subset of voxels from a three-dimensional array of voxels representing the object to form an image of the ROI by at least summing data of the object included in the subset of voxels along the view direction, the subset of voxels representing one or more portions of a plurality of image slices of the object, the subset of voxels selected along a direction perpendicular to a view direction defined by the region of interest;
  rendering the image of the ROI in the GUI window; and
  receiving input via the GUI to manipulate the image of the ROI.

61. The computer-implemented method of claim 60, wherein the one or more graphical user interface elements comprise any of slider bars, a button, a gesture element responsive to a gesture, or a mouse control element.

62. The computer-implemented method of claim 60, wherein one of one or more graphical user interface elements of the GUI allows a user to select a dimension of the region of interest.

63. The computer-implemented method of claim 60, further comprising:
  receiving, via the GUI, input to tag a region within the image of the ROI corresponding to an item of interest; and
  rendering, an image of the tagged region in the GUI window.

64. The computer-implemented method of claim 63, wherein the tagged region is identified by a user by dragging a bounding box to define the tagged region.

65. The computer-implemented method of claim 60, further comprising:
  receiving, via the GUI, input to tag a region within the image of the ROI corresponding to an item of interest; and
  saving, in a memory, data related to the location of the tagged region within the object.

66. The computer-implemented method of claim 65, wherein the tagged region is identified by a user by dragging a bounding box to define the tagged region.

* * * * *